US012604034B2

(12) United States Patent
Kim et al.

(10) Patent No.: US 12,604,034 B2
(45) Date of Patent: *Apr. 14, 2026

(54) METHOD FOR PARTITIONING BLOCK AND DECODING DEVICE

(71) Applicant: LG Electronics Inc., Seoul (KR)

(72) Inventors: Jungsun Kim, Seoul (KR); Seungwook Park, Seoul (KR); Jaewon Sung, Seoul (KR); Joonyoung Park, Seoul (KR); Byeongmoon Jeon, Seoul (KR); Jaehyun Lim, Seoul (KR); Yongjoon Jeon, Seoul (KR); Younghee Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/234,726

(22) Filed: Jun. 11, 2025

(65) Prior Publication Data

US 2025/0310558 A1      Oct. 2, 2025

Related U.S. Application Data

(63) Continuation of application No. 17/840,272, filed on Jun. 14, 2022, now Pat. No. 12,363,341, which is a continuation of application No. 17/827,093, filed on May 27, 2022, now Pat. No. 11,895,333, which is a continuation of application No. 17/090,519, filed on Nov. 5, 2020, now Pat. No. 11,375,233, which is a continuation of application No. 13/823,208, filed as application No. PCT/KR2011/006515 on Sep. 2, 2011, now Pat. No. 10,863,196.

(60) Provisional application No. 61/423,602, filed on Dec. 16, 2010, provisional application No. 61/405,638, filed on Oct. 21, 2010, provisional application No. 61/405,635, filed on Oct. 21, 2010, provisional application No. 61/388,612, filed on Oct. 1, 2010, provisional application No. 61/388,592, filed on Sep. 30, 2010, provisional application No. 61/386,579, filed on Sep. 27, 2010.

(51) Int. Cl.
H04N 19/593      (2014.01)
H04N 19/96      (2014.01)
H04N 19/70      (2014.01)

(52) U.S. Cl.
CPC ........... H04N 19/593 (2014.11); H04N 19/96 (2014.11); H04N 19/70 (2014.11)

(58) Field of Classification Search
CPC ....... H04N 19/593; H04N 19/96; H04N 19/70
USPC ..................................... 375/240.12
See application file for complete search history.

(56) References Cited

U.S. PATENT DOCUMENTS

2009/0310677 A1* 12/2009 Shiodera ................ H04N 19/70
                                                        375/E7.243
2012/0008683 A1* 1/2012 Karczewicz ........... H04N 19/46
                                                        375/E7.243

* cited by examiner

*Primary Examiner* — Joseph G Ustaris
*Assistant Examiner* — Jimmy S Lee
(74) *Attorney, Agent, or Firm* — Fish & Richardson P.C.

(57)      ABSTRACT

Disclosed are a method for partitioning a block and a decoding device. A method for decoding an image comprises the steps of: partitioning one prediction unit, in which an intra prediction is performed in a predetermined intra prediction mode, into a plurality of transform units; and performing the intra prediction for each of the plurality of the transform units on the basis of the predetermined intra prediction mode. Thus, the invention increases the image encoding efficiency.

3 Claims, 13 Drawing Sheets

400

410

420

430

METHOD FOR PARTITIONING BLOCK AND DECODING DEVICE

CROSS REFERENCE TO RELATED APPLICATIONS

This application is a continuation of U.S. application Ser. No. 17/840,272, filed on Jun. 14, 2022, which is a continuation of U.S. application Ser. No. 17/827,093, filed on May 27, 2022, now U.S. Pat. No. 11,895,333, which is a continuation of U.S. application Ser. No. 17/090,519, filed on Nov. 5, 2020, now U.S. Pat. No. 11,375,233, which is a continuation of U.S. application Ser. No. 13/823,208, filed on Mar. 14, 2013, now U.S. Pat. No. 10,863,196, which is a U.S. National Phase Application under 35 U.S.C. § 371 of International Application PCT/KR2011/006515, filed on Sep. 2, 2011, which claims the benefit of U.S. Provisional Application No. 61/386,579, filed Sep. 27, 2010, U.S. Provisional Application No. 61/388,592, filed Sep. 30, 2010, U.S. Provisional Application No. 61/388,612, filed Oct. 1, 2010, U.S. Provisional Application No. 61/405,635, filed Oct. 21, 2010, U.S. Provisional Application No. 61/405,638, filed Oct. 21, 2010 and U.S. Provisional Application No. 61/423,602, filed Dec. 16, 2010, the entire contents of which are hereby incorporated by reference in their entireties.

TECHNICAL FIELD

The present invention relates to a block partitioning method and a decoder and, more particularly, to a method and an apparatus for decoding.

BACKGROUND ART

Recently, a demand for a high resolution, high quality video such as a high definition (HD) video and an ultra high definition (UHD) video is increased in various application fields. As a video becomes high resolution and high quality, video data include increased data amount compared to existing video data, and thus, in a case where the video data is transmitted using a medium such as an existing wire or wireless broadband circuit line or stored using an existing storage medium, a transmission cost and a storage cost are increased. In order to solve these problems generated as the video data becomes high resolution and high quality, video compression techniques of high efficiency may be utilized.

The video compression techniques include various techniques such as an inter prediction technique for predicting a pixel value included in a current picture from a previous or subsequent picture of the current picture, an intra prediction technique for predicting the pixel value included in the current picture by using pixel information within the current picture, and an entropy encoding technique for assigning a short code to a high occurrence frequency value and assigning a long code to a low occurrence frequency value, and the video data may be effectively compressed to be transmitted or stored by using such a video compression technique.

DISCLOSURE

Technical Problem

A first objective of the present invention is to provide a video decoding method for performing an intra prediction based on a plurality of transform units in order to increase video encoding efficiency.

Also, a second objective of the present invention is to provide a method of differentially setting a prediction unit for performing a prediction according to the size of a coding unit in order to perform decoding of a low complexity.

Technical Solution

A method of decoding an video for achieving the first objective of the present invention according to an aspect of the present invention may include partitioning a prediction unit, on which an intra prediction is performed in a predetermined intra prediction mode, into a plurality of transform units and performing the intra prediction with respect to each of the plurality of transform units based on the predetermined intra prediction mode. The partitioning the prediction unit, on which the intra prediction is performed in the predetermined intra prediction mode, into the plurality of transform units may include partitioning such that a size of the plurality of transform units is an N×N size when a size of the prediction unit is a size of 2N×2N. The performing the intra prediction with respect to each of the plurality of transform units based on the predetermined intra prediction mode may include predicting and reconstructing a first transform unit based on the predetermined intra prediction mode; predicting and reconstructing a second transform unit based on a result of reconstructing the first transform unit and the predetermined intra prediction mode; predicting and reconstructing a third transform unit based on a result of reconstructing the first transform unit and the second transform unit and the predetermined intra prediction mode; and predicting and reconstructing a fourth transform unit based on a result of reconstructing the first transform unit, the second transform unit, and the third transform unit and the predetermined intra prediction mode.

A method of decoding an video for achieving the second objective of the present invention according to an aspect of the present invention may include determining a size of a coding unit and determining whether the coding unit is partitioned into a plurality of prediction units if the size of the coding unit is a minimum coding unit. The determining whether the coding unit is partitioned into the plurality of prediction units if the size of the coding unit is the minimum coding unit may include receiving information about whether the coding unit is partitioned based on syntax element information which indicates whether the coding unit is partitioned into the plurality of prediction units. The syntax element information may be defined with a different index value in a case where the size of the coding unit is greater than the minimum coding unit and in a case where the size of the coding unit is the same as the minimum coding unit. The determining whether the coding unit is partitioned into the plurality of prediction units if the size of the coding unit is the minimum coding unit may include determining whether the size of the coding unit is 2N×2N and the coding unit is partitioned to a prediction unit of an N×N size for performing a intra prediction. The determining whether the coding unit is partitioned into the plurality of prediction units if the size of the coding unit is the minimum coding unit may include determining whether a coding unit of a 2N×2N size uses a prediction unit of an N×N size when performing an inter prediction. The determining whether the coding unit of the 2N×2N size uses the prediction unit of the N×N size when performing the inter prediction may include when performing the inter prediction based on predetermined flag information, determining whether a prediction unit of a predetermined size uses the prediction unit of the N×N size. The determining whether the coding unit of the 2N×2N size uses the prediction unit of the N×N size when performing the inter prediction may include determining whether a prediction unit of a 4×4 size is used in the inter prediction based on predetermined flag information. The method of decoding the video may further comprises partitioning such that a size of the plurality of transform units is a N×N size when a size of the prediction unit is a size of 2N×2N. The determining whether the coding unit of the 2N×2N size uses the prediction unit of the N×N size when performing the inter prediction may comprise when performing the inter prediction based on predetermined flag information, determining whether a coding unit of a predetermined size uses the prediction unit of the N×N size. The coding unit may set, based on a syntax element which defines the size of the coding unit, a size of a maximum coding unit for performing an intra prediction and a size of a maximum coding unit for performing an inter prediction. The coding unit may be set as a transform unit to be inverse transformed. The coding unit may be set as a prediction unit and a prediction may be performed by differently setting a size of a coding unit for performing an intra prediction and a size of a coding unit for performing an inter prediction.

Advantageous Effects

As described above, according to a block partition method and a decoder according to an exemplary embodiment of the present invention, when performing an entropy encoding with respect to a coefficient, an entropy encoding mode may be differentiated according to a property of the coefficient to perform the entropy encoding and an entropy decoding may be performed based on a newly defined entropy encoding mode, and an index mapping table for mapping a syntax element value and a code number is adaptively changed, thereby performing the entropy encoding and decoding.

Therefore, a number of bits required for video encoding may be reduced, thereby increasing video encoding efficiency.

MODE FOR INVENTION

While various modifications and example embodiments can be made, only particular example embodiments will be described more fully herein with reference to the accompanying drawings. However, the present invention should not be construed as limited to only the example embodiments set forth herein but rather should be understood to cover all modifications, equivalents or alternatives falling within the scope and technical terms of the invention. Like numbers refer to like elements throughout the drawings.

It will be understood that, although the terms first, second, etc. may be used herein to describe various elements, these elements should not be limited by these terms. These terms are only used to distinguish one element from another. These terms are only used to distinguish one element from another element. For example, a first element could be termed a second element without departing from the teachings of the present invention, and similarly, the second element could be termed the first element. The term "and/or" includes a combination of a plurality of associated listed items or any of the plurality of the associated listed items.

It will be understood that, when a feature or element is referred to as being "connected" or "coupled" to another feature or element, it can be directly connected or coupled to the other element or intervening elements may be present. In contrast, when a feature or element is referred to as being "directly connected" or "directly coupled" to another element, it will be understood that there are no intervening elements present.

The terminology used herein is for the purpose of describing particular embodiments only and is not intended to be limiting of example embodiments of the invention. The singular forms "a", "an" and "the" are intended to include the plural forms as well, unless the context clearly indicates otherwise. It will be understood that the terms "comprises," or "includes," when used herein, specify the presence of stated features, integers, steps, operations, elements, components or any combinations thereof, but do not preclude the presence or addition of one or more other features, integers, steps, operations, elements, components, or any combinations thereof.

Hereinafter, the present invention will be described in detail with reference to the accompanying drawings. Hereinafter, the same reference numbers are used throughout the drawings to refer to the same parts and a repetitive explanation of the same parts will be omitted.

Figure 1:
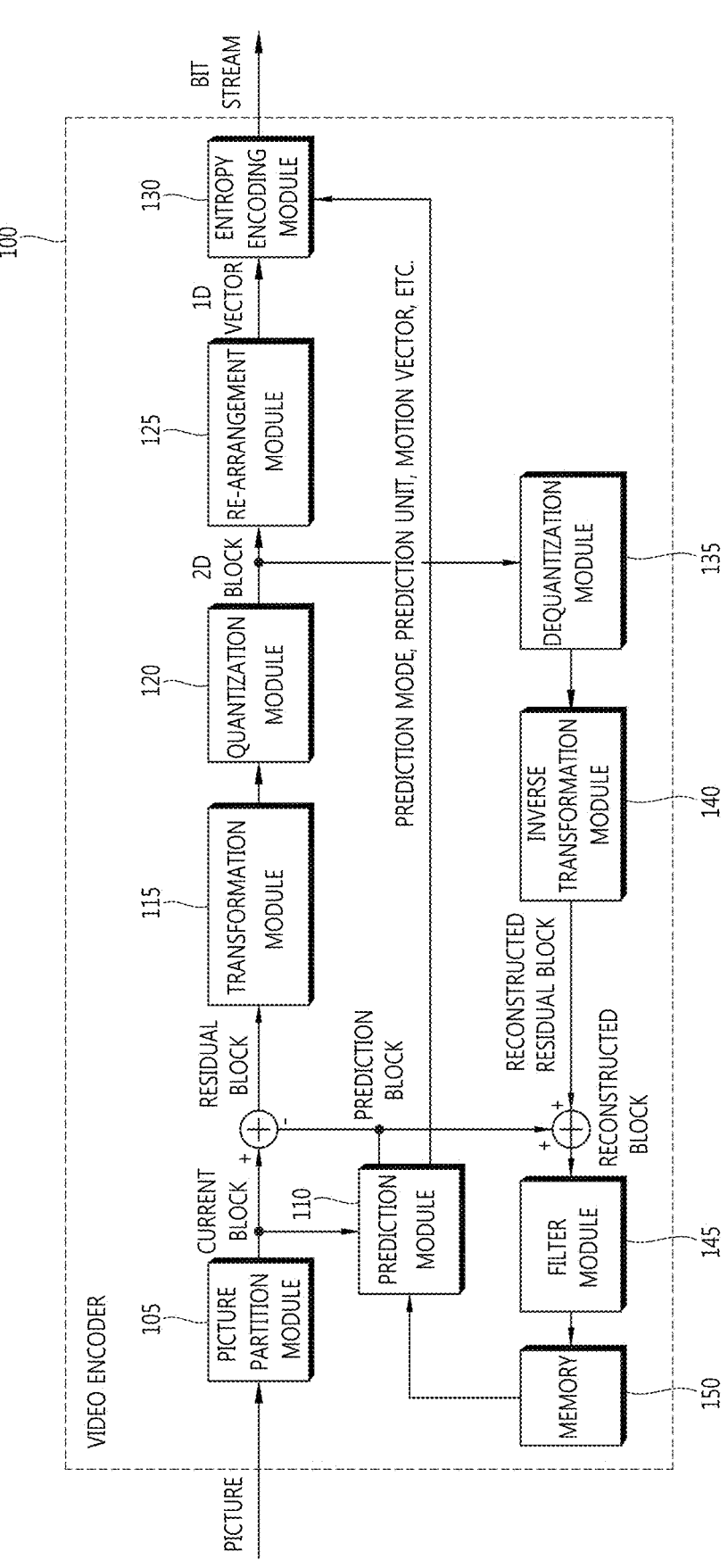
FIG. 1 is a block diagram illustrating an video encoding apparatus according to an exemplary embodiment of the present invention.

FIG. 1 is an exemplary embodiment of the present invention illustrating an video encoder.

Referring to FIG. 1, a video encoding apparatus 100 may include a picture partition module 105, a prediction module 110, a transformation module 115, a quantization module 120, a re-arrangement module 125, an entropy encoding module 130, an dequantization module 135, an inverse transformation module 140, a filter module 145, and a memory 155.

Each element shown in FIG. 1 is independently illustrated in order to provide different features of functions in the video encoder and is not intended to mean that each element is a separate hardware or a software component unit. Namely, each element is listed as respective elements for illustrative purposes, and at least two elements among respective elements may be combined into one element or one element may be partitioned into a plurality of elements to perform a function, and an embodiment in which the respective elements are combined or partitioned is included in the claim scope of the present invention if the embodiment is not off the point of the spirit and scope of the present invention.

The picture partition module 105 may partition an input picture into at least one processing module. Here, the processing module may be a prediction unit (PU), a transform unit (TU), and a coding unit (CU). The picture partition module 105 may partition one picture into a plurality of coding units, prediction units, and transform units and may encode the picture by selecting one combination of the coding unit, the prediction unit, and the transform unit based on a predetermined criterion (for example, a cost function).

For example, one picture may be partitioned into a plurality of the coding units. In order to partition the coding unit, a recursive tree structure such as a quadtree structure may be used. The coding unit which is partitioned into other coding units by using a picture or a maximum size coding unit as a root may be partitioned to have child nodes as many as a number of partitioned coding units. A coding unit that is not partitioned any further according to a certain constraint becomes a leaf node. In other words, when it is assumed that only a square partition is available for one coding unit, one coding unit may be partitioned into maximum four different coding units.

Hereinafter, in an exemplary embodiment of the present invention, the meaning of the coding unit may be used to refer to not only a unit for encoding but also a unit for decoding.

The prediction unit may be partitioned into a form of at lest one of a square or a rectangle having the same size within one coding unit.

The prediction unit may be partitioned into a form of at lest one of a square or a rectangle having the same size within one coding unit or may be partitioned into a form such that, among prediction units partitioned within one coding unit, the shape of one prediction unit is different from the shape of the other prediction unit.

When generating the prediction unit for performing an intra prediction based on the coding unit, when the coding unit is not a minimum coding unit, the intra prediction may be performed without partitioning the coding unit into a plurality of prediction units (N×N).

The prediction module 110 may include an inter prediction module for performing an inter prediction and an intra prediction module for performing an intra prediction. With respect to the prediction module, it may be determined whether to use the inter prediction or whether to perform the intra prediction, and specific information (e.g., an intra prediction mode, a motion vector, a reference picture, etc.) according to each prediction method may be determined. Here, a processing module for performing the prediction and a processing module for determining the prediction method and a specific detail may be different. For example, the prediction method and the prediction mode may be determined in the prediction unit and the prediction may be performed in the transform unit. A residue value (a residue block) between a generated prediction block and an original block may be inputted to the transformation module 115. Also, prediction mode information and motion vector information used for the prediction may be encoded in the entropy encoding module 130 along with the residue value to be transmitted to the decoder. When using a specific encoding mode, it is possible that the prediction block is not be generated through the prediction module 110 but the original block is encoded as it is to be transmitted to the decoder.

The inter prediction module may predict the prediction unit based on information of at least one picture between a previous picture or a subsequent picture of a current picture. The inter prediction module may include a reference picture interpolation module, a motion prediction module, and a motion compensation module.

The reference picture interpolation module may be provided with reference picture information from the memory 155 and may generate pixel information less than an integer pixel from the reference picture. In case of a luma pixel, a DCT-based 8 tap interpolation filter having various filter coefficients may be used to generate pixel information less than the integer pixel in a unit of ¼ pixel. In case of a chroma pixel, a DCT-based 4 tap interpolation filter having various filter coefficient may be used to generate pixel information less than the integer pixel in a unit of ⅛ pixel.

The motion prediction module may perform motion prediction based on a reference picture interpolated by the reference picture interpolation module. For a method of obtaining the motion vector, various methods such as FBMA (Full search-based Block Matching Algorithm), TSS (Three Step Search), or NTS (New Three-Step Search Algorithm) may be used. The motion vector may have a motion vector value in a unit of ½ or ¼ pixel based on the interpolated pixel. The motion prediction module may predict a current prediction unit by varying the motion prediction method. For the motion prediction method, various methods such as a skip method, a merge method, or advanced motion vector prediction (AMVP) method may be used.

The inter prediction module may generate the prediction unit based on reference pixel information near a current block which is information about pixels within the current picture. If a neighboring block of the current prediction unit is a block on which the inter prediction is performed such that reference pixels are pixels on which the inter prediction is performed, the reference pixels included in the block on which the inter prediction is performed may replace the reference pixel information of the neighboring block on which the intra prediction is performed. In other words, when the reference pixel is not available, at least one unavailable reference pixel may be replaced with at least one available reference pixel.

In the intra prediction, the prediction mode may have a directional prediction mode which uses the reference pixel information according to a prediction direction and a non-directional mode which does not use the directional information when performing the prediction. A mode for predicting luma information and a mode for predicting chroma information may be different, and intra prediction mode information which predicts the luma pixel and predicted luma signal information may be utilized to predict the chroma pixel.

When the size of the prediction unit and the size of the transform unit are the same, intra prediction is preformed based on the pixels which exist in the left side of the prediction unit, the pixels which exist in the left side upper portion thereof, and the pixels which exist in an upper portion thereof. However, when the size of the prediction unit and the size of the transform unit are different intra prediction is performed based on the reference pixels based on the transform unit. Also, only a minimum prediction unit may use the intra prediction which uses an N×N partition.

When performing the intra prediction and the inter prediction, the prediction may be performed based on the coding unit, not the prediction unit performing the prediction. Also, the size of a maximum coding unit for performing the prediction may be set differently in case of performing the intra prediction and in case of performing the inter prediction. Also, the block combination for performing the inter prediction and a intra prediction may be set differently to perform the prediction such that shape of the prediction unit used for partition may be different to each other.

In the intra prediction method, according to the prediction mode, an adaptive intra smoothing (AIS) filter may be applied to the reference pixel to generate the prediction block. A kind of the AIS filter which applies to the reference pixel may be different. In order to perform the intra prediction method, the intra prediction mode of the current prediction unit may predict from the intra prediction mode of the prediction unit which exists around the current prediction unit. When predicting the prediction mode of the current prediction unit by using mode information predicted from a neighboring prediction unit, if the intra prediction modes of the current prediction unit and the neighboring prediction unit are the same, information that the prediction mode of the current prediction unit and the neighboring prediction unit are the same may be transmitted using predetermined flag information, and if the prediction modes of the current prediction unit and the neighboring prediction unit are different, entropy encoding may be performed to encode the prediction mode information of the current block.

Also, a residual block including residual value information which is a difference value between the prediction unit on which the prediction is performed and an original block of the prediction unit. The generated residual block may be inputted to the transformation module 115. The transformation module 115 may transform the residual block including the residual value information in unit of the prediction unit through the original block and the prediction unit generated in the prediction module 110 by using a transformation method such as a discrete cosine transform (DCT) or a discrete sine transform (DST). Whether to apply the DCT or the DST in order to transform the residual block may be determined based on the intra prediction mode information of the prediction unit used for generating the residual block.

When performing transformation, the transformation may be performed based on the coding unit, not the transform unit. The quantization module 120 may quantize values transformed in a frequency domain in the transformation module 115. Depending on a block or an importance of an image, a quantization coefficient may be varied. A value obtained by the quantization module 120 may be provided to the dequantization module 135 and the re-arrangement module 125.

The re-arrangement module 125 may re-arrange the coefficient value with respect to the quantized residue value.

The re-arrangement module 125 may modify coefficients of a two dimensional block form into a form of a one dimensional vector through a coefficient scanning method. For example, in the re-arrangement module 125, from a DC coefficient to a coefficient in a high frequency domain may be scanned to be transformed to a one dimension vector form by using a zigzag scan method. According to the size of a transformation unit and the intra prediction mode, a vertical scan method of scanning the two dimensional coefficients in a block form in a column direction and a horizontal scan method of scanning the two dimensional coefficients in the block form in a row direction may be used instead of the zigzag scan method. In other words, it may be determined which scan method among the zigzag scan, a vertical direction scan, and a horizontal direction scan is used according to the size of the transformation unit and the intra prediction mode.

The entropy encoding module 130 performs the entropy encoding based on values obtained by the re-arrangement module 125. The entropy encoding may use various encoding methods such as, for example, Exponential Golomb, Context-Adaptive Variable Length Coding (CAVLC), and Context-Adaptive Binary Arithmetic Coding (CABAC).

The entropy encoding module 130 may encode various information such as, residual value information in unit of the encoding, block type information, prediction mode information, partition unit information, prediction unit information, transmission unit information, motion vector information, reference frame information, block interpolation unit, and filtering information from the re-arrangement module 125 and the prediction module 110.

The entropy encoding module 130 may perform the entropy encoding on the coefficient value in the coding unit input from the re-arrangement module 125.

A table such as a variable length coding table for performing the entropy encoding may be stored in the entropy encoding module 130 and the entropy encoding may be performed by using the stored variable length coding table. In performing the entropy encoding, a method of using a counter or a direct swapping method for a part of a codeword included in the table may be used to change codeword assignment with respect to a code number of corresponding information. For example, in a table mapping the code number and the codeword, in a case of several upper code numbers to which codewords having a lower bit number are assigned, a mapping order of the table mapping the codeword and the code number may be adaptively changed by using the counter such that a codeword of a shorter length is assigned to a code number having more larger counting sum. When a counting sum of the counter reaches a predetermined threshold value, the counting sum recorded in the counter may be divided in half and the counter performs counting again.

With respect the code number within the table that does not perform the counting, the direct swapping method may be used such that, when information corresponding to a code number is generated, a bit number assigned to a corresponding code number is reduced through a method of swapping a place thereof with an immediately above code number, thereby performing the entropy encoding.

The dequantization module 135 and the inverse transformation module 140 dequantizes values quantized by the quantization module 120 and inverse transforms values transformed by the transformation module 115. The residual value generated in the dequantization module 135 and the inverse transformation module 140 may be combined with the prediction unit predicted through the motion estimation module 145, the motion compensation module and the intra prediction module included in the prediction module 110 to generate a reconstructed block.

The filter module 145 may include at least one of a deblocking filter, an offset correction module, and an adaptive loop filter (ALF).

The deblocking filter may remove a block distortion generated due to boundarys between blocks in a reconstructed picture. In order to determine whether to perform the deblocking, it may be determined whether to apply the deblocking filter to the current block based on pixels included in several columns or rows included in the block. When applying the deblocking filter to the block, a strong filter or a weak filter may be applied depending on a required deblocking filtering strength. Also, in applying the deblocking filter, when performing a vertical filtering and a horizontal filtering, a horizontal direction filtering and a vertical direction filtering may be processed in parallel.

The offset correction module may correct an offset from an original video based on a pixel unit with respect to the video on which the deblocking is performed. In order to perform the offset correction with respect to a specific picture, pixels included in the video may be partitioned into a predetermined number of regions, and a region on which the offset is to be performed is determined, and a method of applying the offset to a corresponding region or a method of applying the offset by considering edge information of each pixel may be used.

The adaptive loop filter (ALF) may perform filtering based on a value of comparing the filtered reconstructed image and the original image. After partitioning pixels included in the image into a predetermined group, one filter to apply to a corresponding group may be determined to differentially perform on each group. Information about whether to apply the ALF may be transmitted in the coding unit (CU) and a size and a coefficient of the ALF to apply may be different according to each block. The ALF may have various shapes, and a number of coefficients included therein may be different according to the filter. Information (filter coefficient information, ALF On/Off information, filter form information) related to filtering of the ALF may be included in a predetermined parameter set in a bit stream to be transmitted.

The memory 155 may store a reconstructed block or picture obtained through the filter module 145, and the stored reconstructed block or picture may be provided to the prediction module 110 when performing the inter prediction.

Figure 2:
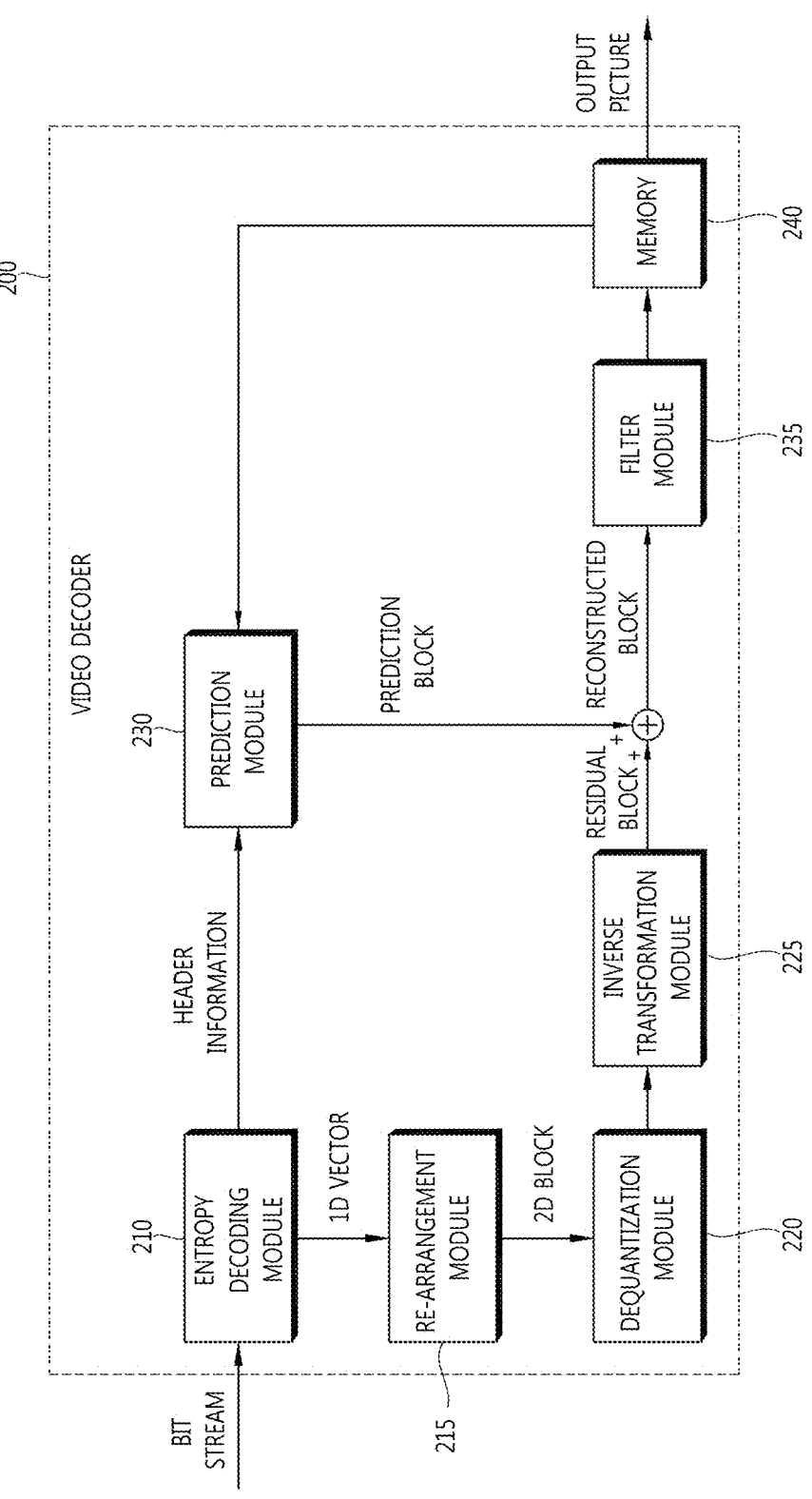
FIG. 2 is a block diagram illustrating an video decoder according to an another exemplary embodiment of the present invention.

FIG. 2 is an another exemplary embodiment of the present invention illustrating an video decoder.

Referring to FIG. 2, an video decoder 200 may include an entropy decoding module 210, a re-arrangement module 215, a requantization module 220, an inverse transformation module 225, a prediction module 230, a filter module 235, and a memory 245.

When an video bit stream is inputted from an video encoder, the input bit stream may be decoded in an order opposite to the video encoder.

The entropy decoding module 210 may perform entropy decoding in an opposite order of performing the entropy encoding in the entropy encoding module of the video encoder. For example, a VLC table used for performing the entropy decoding in the video encoder may be implemented in the same variable length coding table in the entropy decoding module to perform the entropy decoding. Information for generating the prediction block among information decoded by the entropy decoding module 210 may be provided to the prediction module 230 and the residue value for performing the entropy decoding in the entropy decoding module may be inputted to the re-arrangement module 215.

Similarly to the entropy encoding module, the entropy decoding module 210 may transform a codeword assignment table by using the counter or a direct swapping method and may perform the entropy decoding based on the transformed codeword assignment table.

Information related to the intra prediction and the inter prediction performed by the encoder may be decoded. As described above, when there is a predetermined limitation to performing the intra prediction and the inter prediction in the video encoder, information related to the intra prediction and the inter prediction of the current block may be provided by performing the entropy decoding based on such limitation.

The re-arrangement module 215 may perform rearrangement of the bit stream which is entropy decoded by the entropy decoding module 210 based on a re-arrangement method of the encoder. Coefficients expressed in a one dimension vector form may be again reconstructed and re-arranged in a two dimensional block form. The re-arrangement module may be provided with information related to a coefficient scanning performed by the encoder and may perform re-arrangement through a method of inverse-scanning based on an order of scanning performed by a corresponding encoder.

The requantization module 220 may perform requantization based on the quantized parameter and the coefficient values of the rearranged block provided from the encoder.

The inverse transformation module 225 may perform an inverse DCT and an inverse DST with respect to the DCT and the DST performed by the transformation module with respect to a result of quantization performed by the video encoder. The inverse transformation may be performed based on the transmission module determined by the video encoder. In the transformation module of the video encoder, the DCT and the DST may be selectively performed according to a plurality of information such as the prediction method, the size of the current block, and the prediction direction, and the inverse transformation module 225 of the video decoder may perform inverse transformation based on transformation information performed in the transformation module of the video encoder.

When performing the transformation, the transformation may be performed based on the coding unit, not the transform unit. The prediction module 230 may generate the prediction block based on information related to generating the prediction block provided from the entropy decoding module 210 and information of the previously decoded block or picture provided from the memory 215.

As described above, similar to an operation of the video encoder, when the size of the prediction unit and the size of the transform unit are the same, the intra prediction may be performed based on the pixels which exist in the left side of the prediction unit, the pixels which exist in the left side upper portion thereof, and the pixels which exist in the upper portion thereof may be performed; however, in a case where the size of the prediction unit and the size of the transform unit are different when performing the intra prediction, the intra prediction may be performed by using the reference pixels based on the transform unit. Also, the intra prediction which uses the N×N partition only with respect to the minimum prediction unit may be used.

When performing the intra prediction and the inter prediction, the prediction may be performed based on the coding unit, not the prediction unit. Also, the prediction may be performed by differently setting the size of the maximum coding unit for performing the prediction in case of performing the intra prediction and in case of performing the inter prediction. Further, the prediction may be performed by setting differently a combination of blocks for performing the intra prediction and, thereby differentiating the shape of the prediction unit used for partition. The prediction module 230 may include a prediction unit determination module, an inter prediction module, and an intra prediction module. The prediction unit determination module may receive various information such as prediction unit information, prediction mode information of the intra prediction method, and motion prediction related information of the inter prediction method input from the entropy decoder. The prediction module 230 distinguishes the prediction unit of the current coding unit, and determines whether the prediction unit performs the inter prediction or the intra prediction. The inter prediction module may perform the inter prediction with respect to the current prediction unit based on information included in at least one picture between the previous picture or the subsequent picture of the current picture including the current prediction unit by using information required for the inter prediction of the current prediction unit provided by the video encoder.

In order to perform the inter prediction, it may be determined based on the coding unit whether the motion prediction method of the prediction unit included in a corresponding coding unit is the skip mode, the merge mode, or the AMVP mode.

The intra prediction module may generate the prediction block based on pixel information within the current picture. When the prediction unit is the prediction unit for performing the intra prediction, the intra prediction may be performed based on intra prediction mode information of the prediction unit provided by the video encoder. The intra prediction module may include the AIS filter, a reference pixel interpolation module, and a DC filter. The AIS filter is a part for performing filtering on the reference pixel of the current block, and whether to apply the filter may be determined and applied according to the prediction mode of the current prediction unit. An AIS filtering may be performed on the reference pixels of the current block by using the prediction mode of the prediction unit and the AIS filter information provided by the video encoder. When the prediction mode of the current block is a mode that does not perform the AIS filtering, the AIS filter may not apply to the current block.

The reference pixel interpolation module may generate reference pixels in pixel unit less than an integer value by interpolating the reference pixels when the prediction mode of the prediction unit is the prediction unit for performing intra prediction based on a pixel value of the interpolated reference pixel. When the prediction mode of the current prediction unit is a prediction mode that generates the prediction block without interpolating the reference pixels, the reference pixel may not be interpolated. The DC filter may generate the prediction block through filtering if the prediction mode of the current block is DC mode.

The reconstructed block or picture may be provided to the filter module 235. The filter module 235 may include a deblocking filter, an offset correction module, an ALF.

Information about whether the deblocking filter is applied to a corresponding block or picture and information about whether a strong filter or a weak filter is applied may be provided from the video encoder. The deblocking filter of the video decoder may be provided with information about the deblocking filter from the video encoder and perform deblocking filtering for the corresponding block in the video decoder. Similarly to the video encoder, a vertical deblocking filtering and a horizontal deblocking filtering are first performed while at least one of the vertical deblocking and the horizontal deblocking may be performed in an overlapping area. In the overlapping area of the vertical deblocking filtering and the horizontal deblocking filtering, the vertical deblocking filtering or the horizontal deblocking filtering which has not previously performed may be performed. Through this deblocking filtering process, a parallel processing of the deblocking filtering may be possible.

The offset correction module may perform offset correction on the reconstructed image based on a type of the offset correction applied to the image and offset value information.

The ALF may perform filtering based on the value of comparing the reconstructed image and the original image after filtering is performed. The ALF may be applied to the coding unit based on information about whether to apply the ALF, information about an ALF coefficient provided from the encoder. The ALF information may be included in a particular parameter set to be provided.

The memory 245 may store the reconstructed picture or block to be used as the reference picture or the reference block and the reconstructed picture may be provided to the output unit.

Hereinafter, although the coding unit is used to refer to a unit of coding in an exemplary embodiment for illustrative purposes, the coding unit may be a unit for performing not only an encoding but also a decoding.

Figure 3:
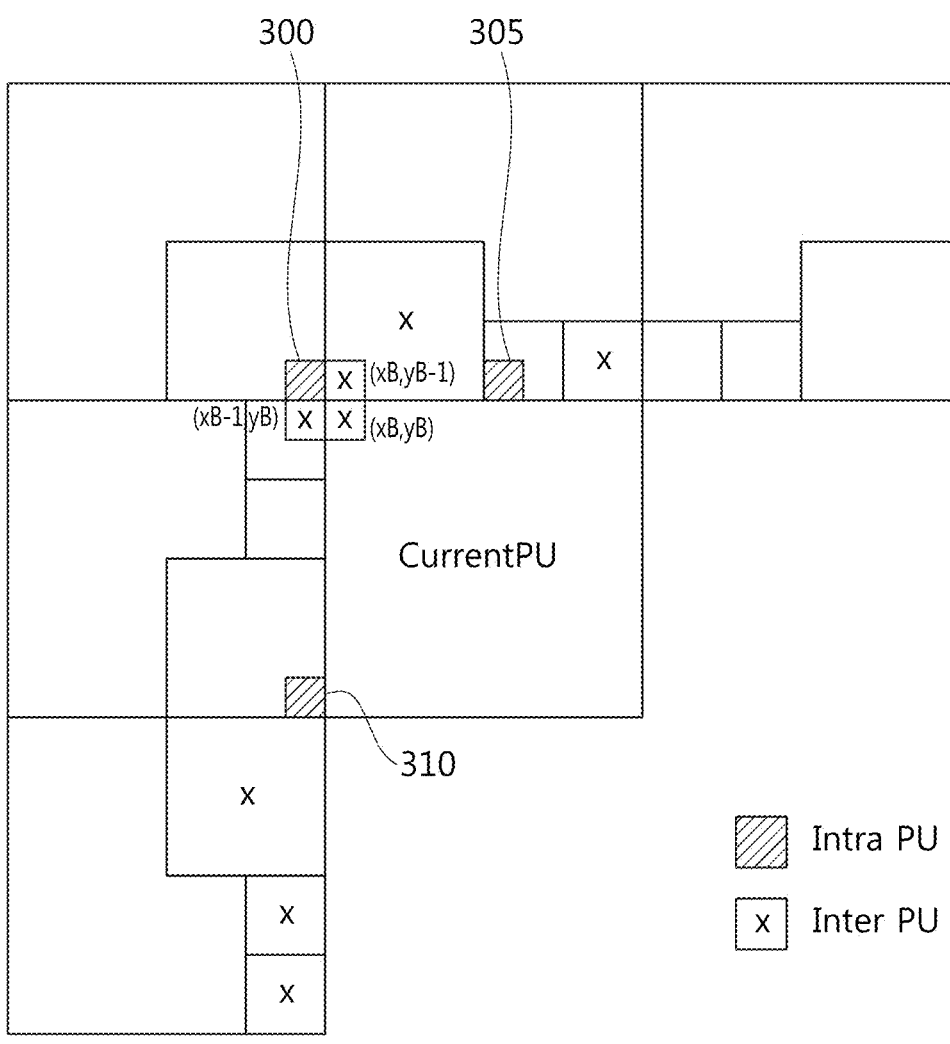
FIG. 3 is a conceptual diagram illustrating a method of generating a reference pixel which is used when performing an intra-screen prediction according to an another exemplary embodiment of the present invention.

FIG. 3 is an another exemplary embodiment of the present invention illustrating a method of generating reference pixels which are used when performing an intra prediction.

Referring to FIG. 3, when performing the intra prediction, if the location of the pixel on the left side upper portion of the current block is defined as (xB, yB), the reference pixel may be a pixel located at (xB−1, yB−1), (xB−1+x, yB−1), and (xB−1, yB−1+y) (here, x is an integer ranging from 0 to 2nS−1, y is an integer ranging from 0 to 2nS−1).

If the prediction unit is located at a boundary of a slice and thus the reference pixel does not exist, or a constraint intra prediction (CIP) is performed and the reference pixel is not available in the intra prediction, for example, a case where the reference pixel of the current prediction unit is predicted by the inter prediction, the value of a corresponding reference pixel may be changed to the value of other reference pixel available for the intra prediction.

An unavailable reference pixel may be obtained through a value of an available neighboring reference pixel or an average value of available neighboring reference pixels. For example, if a block located at the upper portion of the current prediction unit performs the inter prediction such that the reference pixel is not available, an available reference pixel 300 in the left side and an available reference pixel 305 in the right side are used to replace the unavailable pixel value. An average of the pixel value of the available reference pixel 300 in the left side and the pixel value of the available reference pixel 305 in the right side may replace the unavailable pixel value.

In another example, when only one available reference pixel 310 exists around values of the unavailable reference pixels, the available reference pixel 310 may be used as the replaced pixel value of the unavailable reference pixel to perform the intra prediction.

Hereinafter, in an exemplary embodiment of the present invention, it is assumed that pixel values of every reference pixel are available for illustrative purposes. However, the claim scope of the present invention is not necessarily limited to a case where every reference pixel is available but the reference pixel unavailable for the intra prediction may be generated as the reference pixel available for the intra prediction through an additional reference pixel generation process as above.

Figure 4:
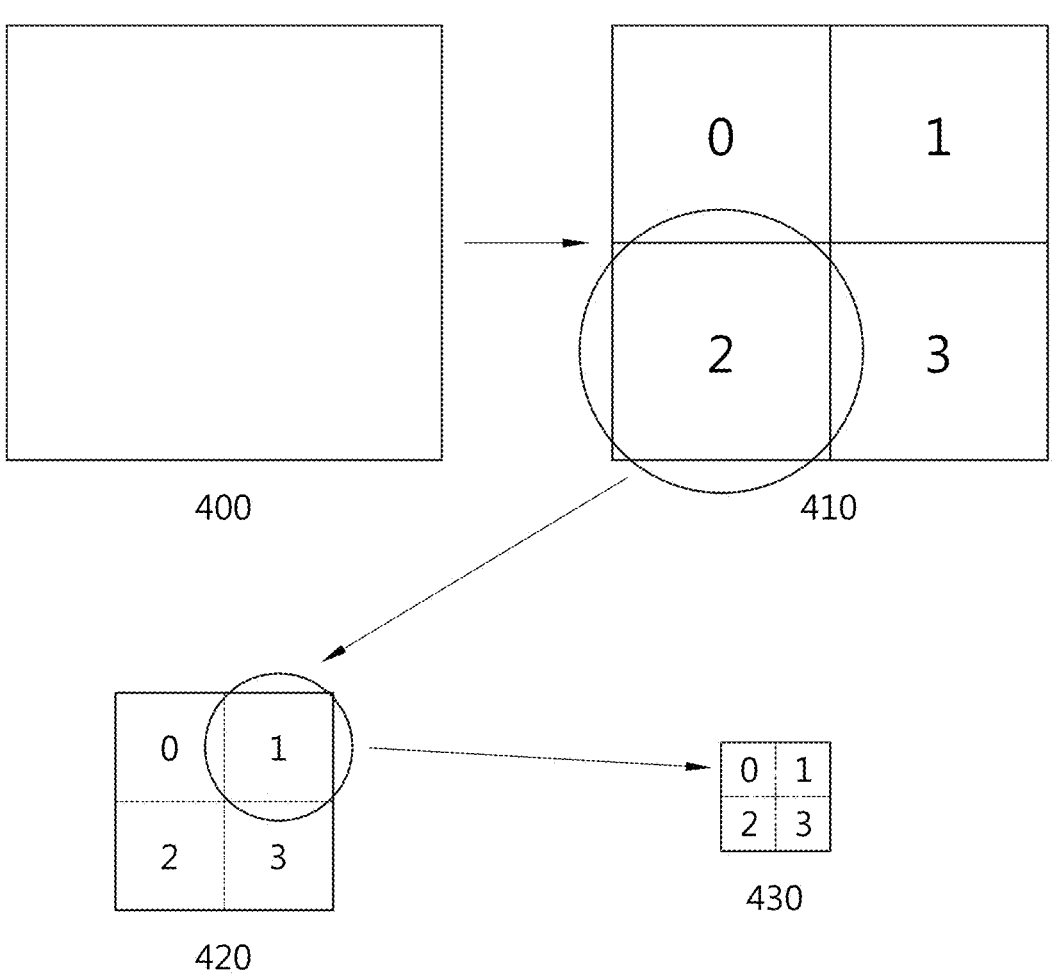
FIG. 4 is a conceptual diagram illustrating a partition structure of a block according to an another exemplary embodiment of the present invention.

FIG. 4 is an another exemplary embodiment of the present invention illustrating a partition structure of a block.

Referring to FIG. 4, one coding unit may be partitioned into at lest one of a coding unit, a prediction unit, and a transform unit. For example, a first coding unit 400 may be partitioned into a plurality of second coding units 410 by using the quad tree structure. The partitioned second coding unit 410 may be partitioned into a plurality of prediction units 420 and one prediction unit among the plurality of partitioned prediction units 420 may be again partitioned into a plurality of transform units 430.

The intra prediction or the inter prediction are performed in the prediction unit, and when performing the intra prediction for the prediction unit, the reference pixel information for performing the intra prediction may be varied according to whether the prediction unit is partitioned into one transform unit or partitioned into a plurality of transform units.

Figure 5:
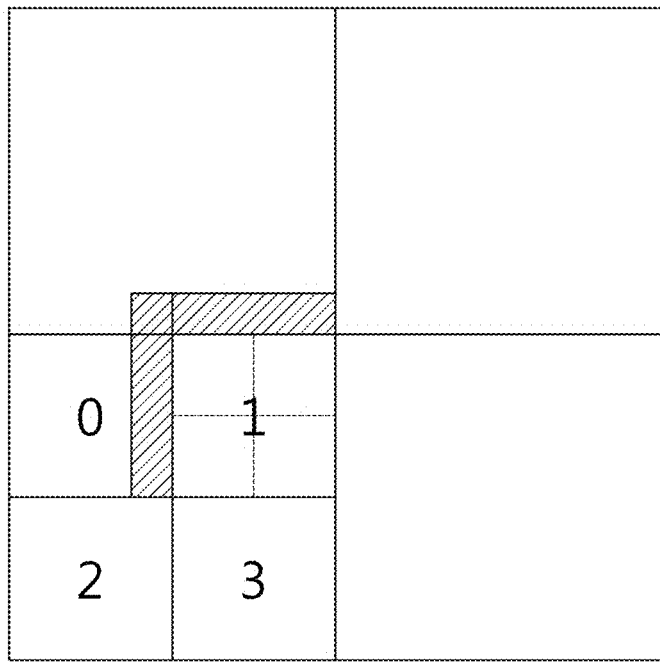
FIG. 5 is a conceptual diagram illustrating a reference pixel according to a prediction unit according to an another exemplary embodiment of the present invention.
Figure 5:
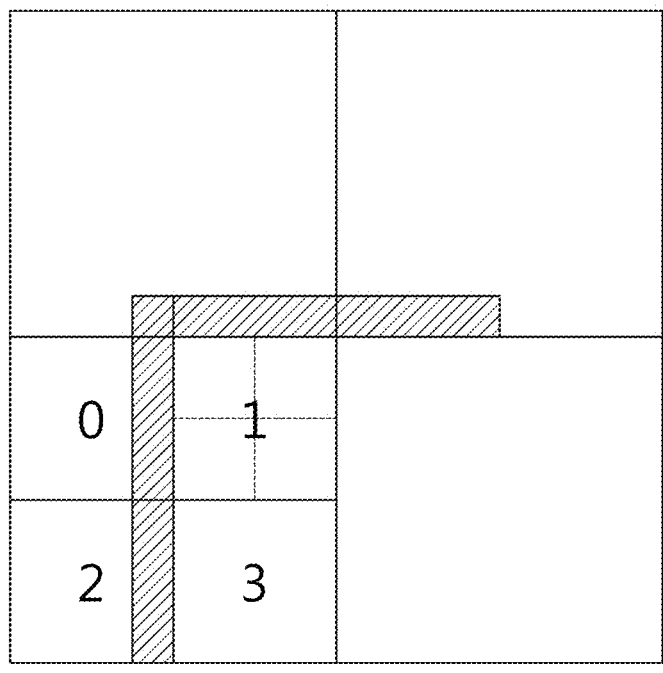

FIG. 5 is an another exemplary embodiment of the present invention illustrating a reference pixel for a prediction unit.

Referring to FIG. 5, if the size of the prediction unit and the size of the transform unit are the same when performing the intra prediction, the intra prediction may be performed on the prediction unit based on the pixels which exist in the left side of the prediction unit, the pixels which exist in the left side upper portion thereof, and the pixels which exist in the upper portion thereof. As described in FIG. 3, the unavailable reference pixel may be replaced with based on the pixel value of the available reference pixel. According to the prediction mode, the reference pixels of a range shown in the upper part of FIG. 5. However, a range of the reference pixels which are used for the prediction may be expanded as shown in the lower part of FIG. 5. In other words, the range of the reference pixel may be varied according to the prediction mode and hereinafter, in an exemplary embodiment of the present invention, it is assumed that the reference pixels shown in the lower part of FIG. 5 is used.

Figure 6:
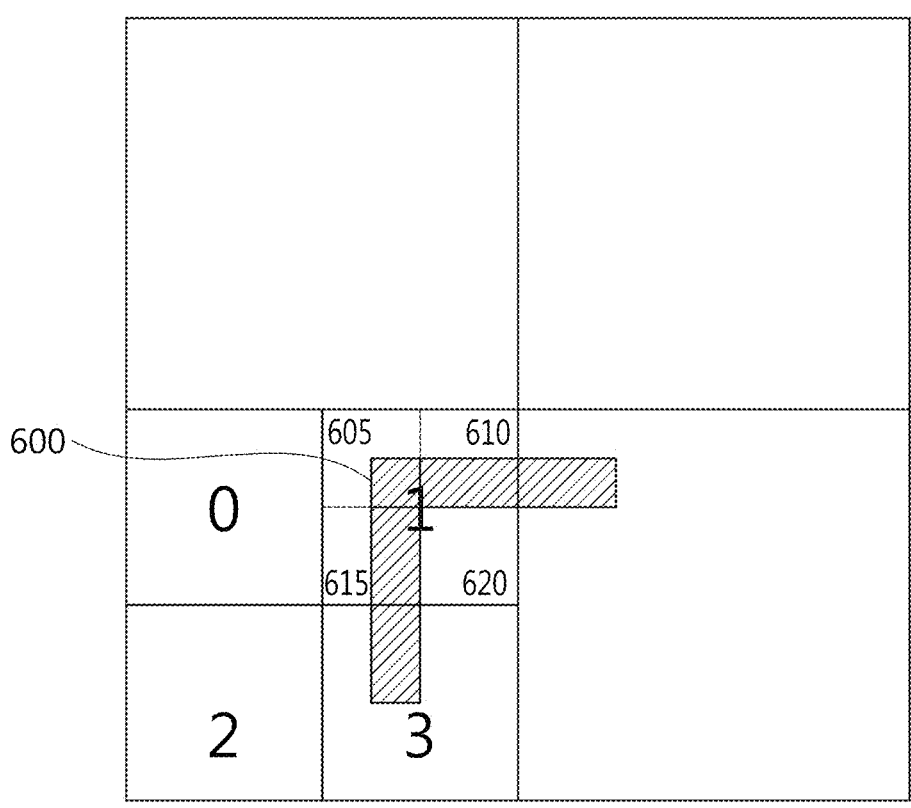
FIG. 6 is a conceptual diagram illustrating a reference pixel according to a prediction unit according to an another exemplary embodiment of the present invention.

FIG. 6 is an another exemplary embodiment of the present invention illustrating a reference pixel.

Referring to FIG. 6, when performing the intra prediction, if the size of the prediction unit and the size of the transform unit are different, reference pixels based on the transform unit may be used to perform the intra prediction.

One prediction unit 600 is partitioned into a plurality of transform units 605, 610, 615, 620 and the intra prediction may be performed based on the reference pixels according to the partitioned transform units 605, 610, 615, 620. For example, the transform unit 620 may perform the intra prediction on the transform unit based on the pixel value of reference pixels which exist in the left side of the transform unit 620, reference pixels which exist in the left side upper portion thereof, and reference pixels which exist in the upper portion thereof.

When the one prediction unit 600 is partitioned into the plurality of transform units 605, 610, 615, 620, an order of prediction may be an order of the transform unit 605, the transform unit 610, the transform unit 615, and the transform unit 620 by using a z-scan order, thereby performing the intra prediction.

Figure 7:
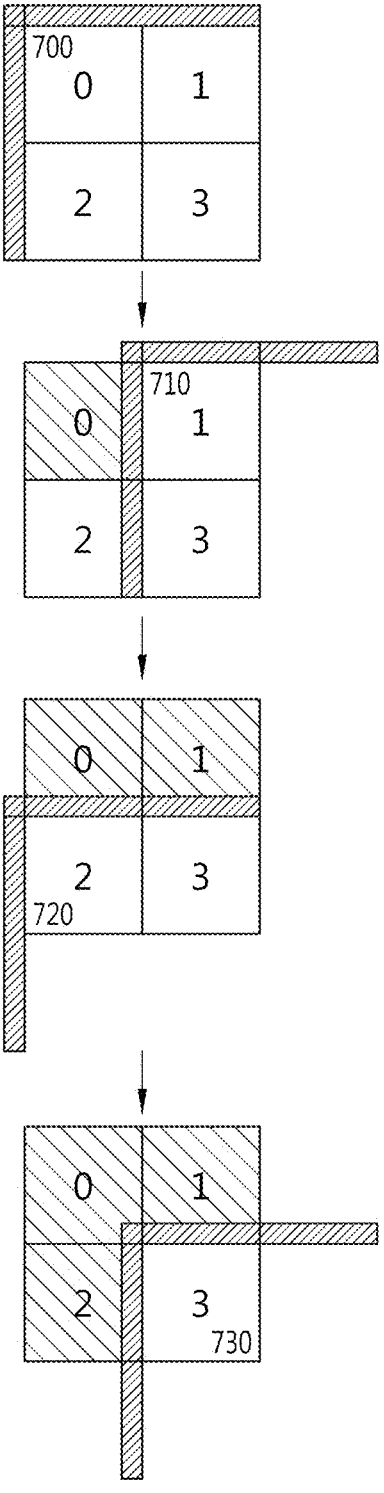
FIG. 7 is a conceptual diagram illustrating an intra prediction method according to an another exemplary embodiment of the present invention.

FIG. 7 is an another exemplary embodiment of the present invention illustrating an intra prediction method.

Referring to FIG. 7, it may be assumed that one prediction unit may perform the intra prediction and may be partitioned into a plurality of transform units, and the intra prediction may be performed with respect to the plurality of the transform units based on the z-scan order. As described above, each transform unit may have the same prediction mode and different reference pixel information to perform the intra prediction.

A first transform unit 700 which is first in the z-scan order performs the intra prediction based on pixel values of reference pixels which exist on the left side of the first transform unit 700, reference pixels which exist in the left side upper portion thereof, and reference pixels which exist on the upper portion thereof. When the first transform unit 700 is reconstructed by performing the intra prediction on the first transform unit 700, pixel values included in the reconstruction block of the first transform unit 700 may be used as reference pixels to perform a intra prediction for the second transform unit 710. In the same manner, reference pixels included in the reconstruction block generated based on the result of performing the intra prediction for the first transform unit 700 and the second transform unit 710 may be used as a reference pixel of a third transform unit 720 to perform the intra prediction for the third transform unit 720. A fourth transform unit 730 is a transform unit for performing the intra prediction lastly in the z-scan order and may perform the intra prediction based on a reference pixels included in the reconstruction block generated based on the result of performing the intra prediction for the first transform unit 700, the second transform unit 710, and the third transform unit 720.

In the intra prediction method according to an exemplary embodiment of the present invention, transform unit can be scanned by various scanning methods as long as it does not depart from the spirit and scope of the present invention.

Figure 8:
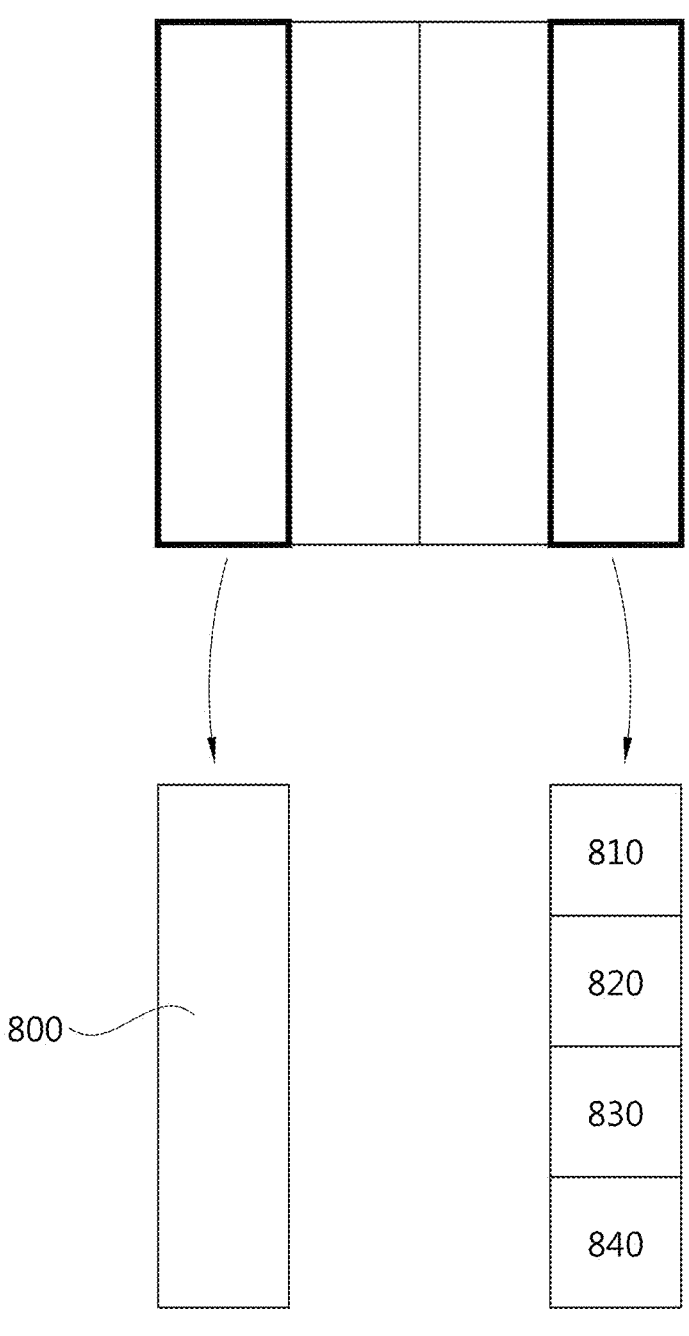
FIG. 8 is a conceptual diagram illustrating an intra prediction method according to an another exemplary embodiment of the present invention.

FIG. 8 is an another exemplary embodiment of the present invention illustrating an intra prediction method.

Referring to FIG. 8, when performing the intra prediction by using a short distance intra prediction (SDIP; hereinafter, the term "short distance intra prediction" is used to refer to the same meaning as SDIP), one prediction unit may be partitioned into one transform unit 800 or a plurality of transform units 810, 820, 830, 840.

For example, when using a prediction unit as 4×16, 16×4, 2×8 or 8×2, in order to perform the transformation, a block having the same size as one prediction unit (4×16, 16×4, 2×8 or 8×2) may be the transform unit for performing the transformation. For another example, the prediction unit may be partitioned into 4×4 size transform units when the size of the prediction unit is 4×16 or 16×4 and partitioned into a plurality of 2×2 size transform units when the size of the prediction unit is 2×8 or 8×2 to perform the transformation.

When one prediction unit is used as the transform unit in order to perform the transformation in the intra prediction using the short distance intra prediction, the intra prediction may be performed on the prediction unit by using the neighboring reference pixels of the prediction unit as described in FIG. 3.

In the short distance intra prediction, a transform unit can be an unit of a intra prediction based on neighboring pixel information of the transform unit.

Figure 9:
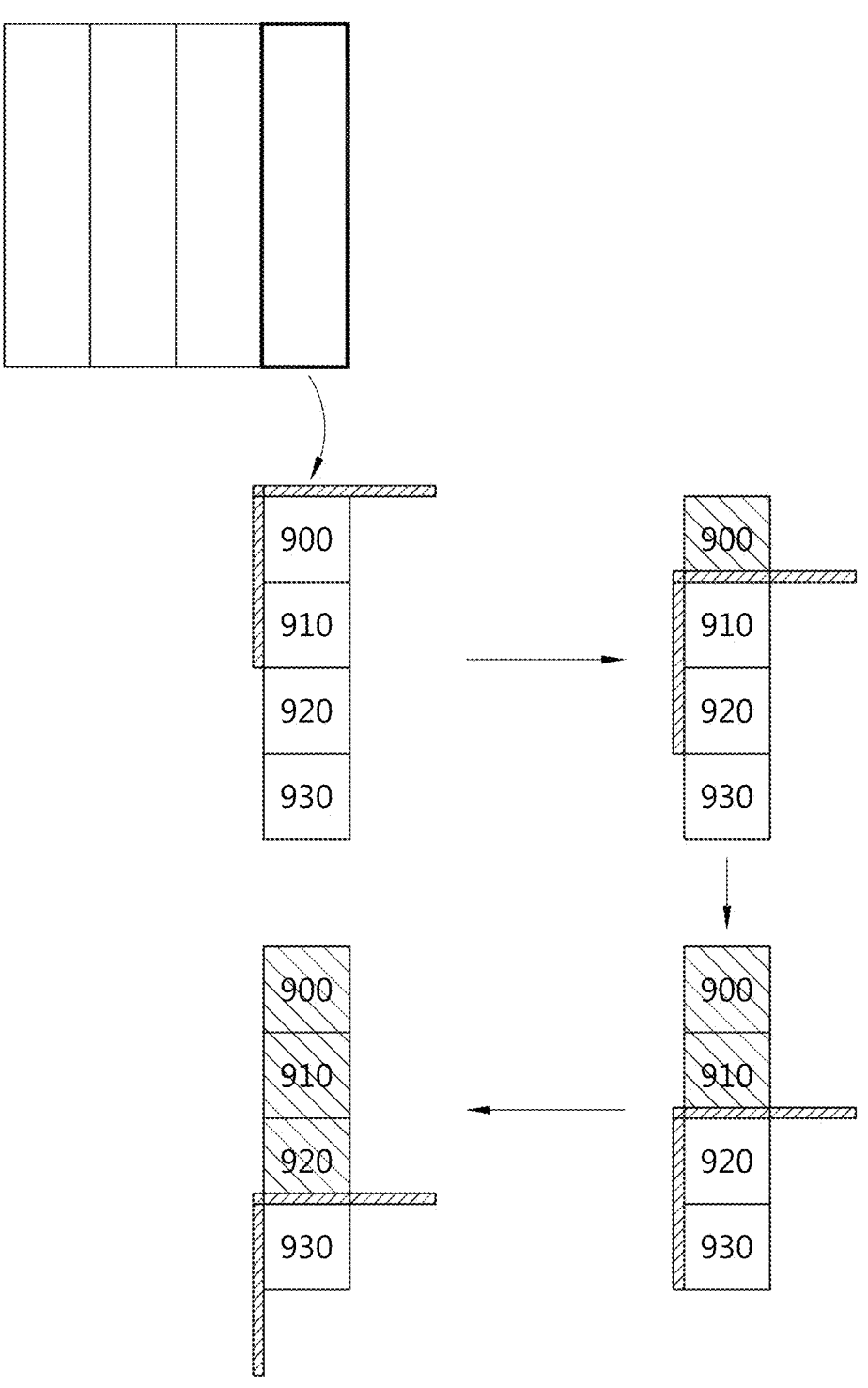
FIG. 9 is a conceptual diagram illustrating an intra prediction using a short distance intra prediction method according to an another exemplary embodiment of the present invention.

FIG. 9 is an another exemplary embodiment of the present invention illustrating an intra prediction using a short distance intra prediction method.

Referring to FIG. 9, the intra prediction may be performed on the transform unit based on pixel values of reference pixels which exist in the left side of a first transform unit 900, reference pixels which exist in the left side upper portion thereof, and reference pixels which exist in the upper portion thereof. The intra prediction of a second transform unit 910 may be performed by using pixel information included in a reconstruction block generated based on the result of performing the intra prediction on the first transform unit 900 as upper portion reference pixels of the second transform unit 910. The intra prediction may be performed on the second transform unit 910 based on reference pixels which exist in the left side of the second transform unit 910, reference pixels which exist in the left side upper portion thereof, and reference pixels which exist in the upper portion thereof, and the intra prediction may be performed on a third transform unit 920 in the same manner as a method of performing the intra prediction on the second transform unit 910 based on a reconstruction block generated based on a result of performing the intra prediction on the second transform unit 910. A fourth transform unit 930 may perform the intra prediction based on a result of performing the intra prediction on the third transform unit 920.

Figure 10:
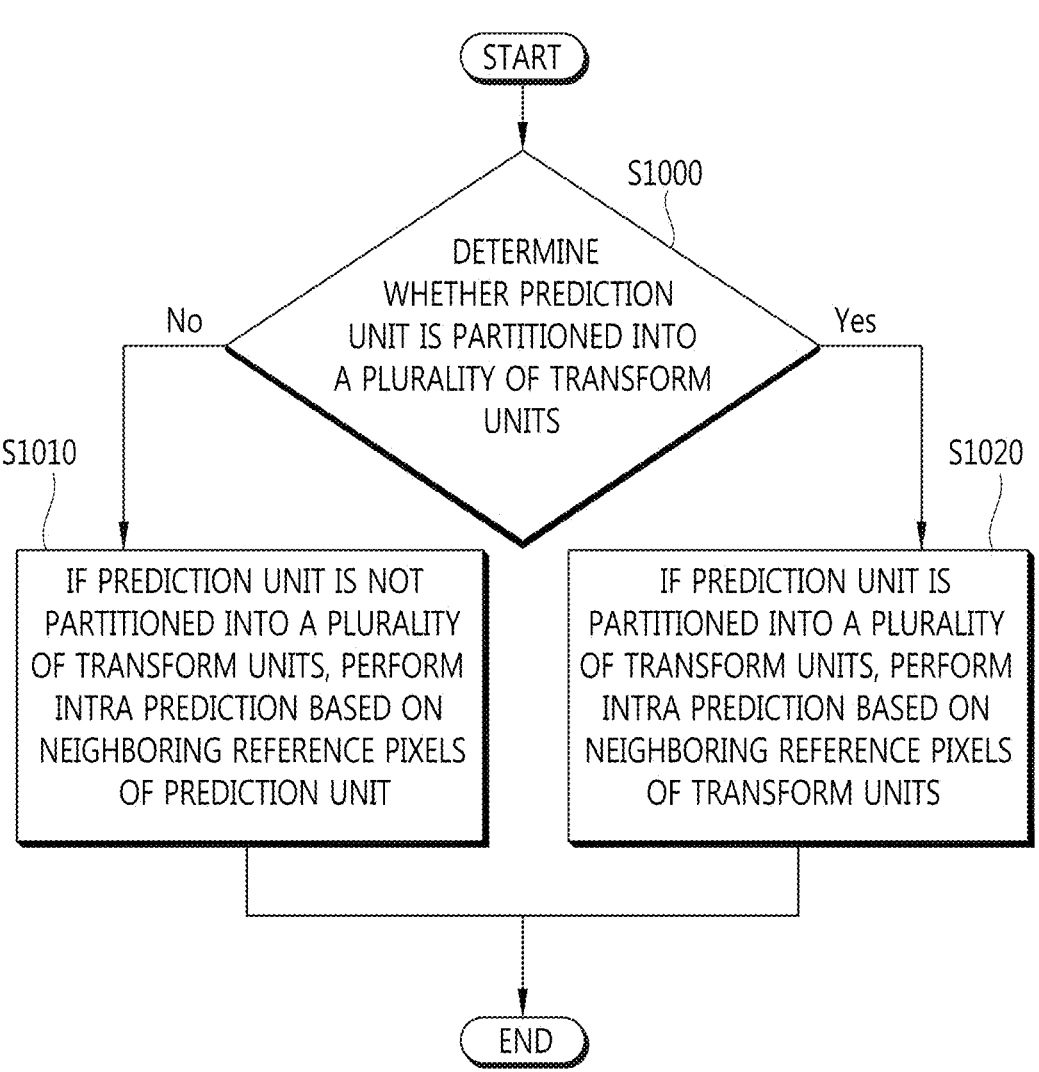
FIG. 10 is a flow chart illustrating an intra prediction method according to an another exemplary embodiment of the present invention.

FIG. 10 is an another exemplary embodiment of the present invention illustrating an intra prediction method.

Referring to FIG. 10, in order to perform the intra prediction, it is determined whether the prediction unit is partitioned into a plurality of transform units (step S1000).

As described above, the reference pixel for performing the intra prediction may be different according to whether the prediction unit is partitioned into one transform unit or partitioned into a plurality of transform units. Whether the current prediction unit is partitioned into a plurality of transform units is determined by using a partition information indication flag indicating whether the current prediction unit is partitioned into a plurality of transform units.

When the prediction unit has a specific size that cannot be partitioned into a further transform unit, a step of determining whether the prediction unit is partitioned into the transform units may be omitted.

When the prediction unit is not partitioned into a plurality of transform unit, the intra prediction may be performed based on the neighboring reference pixel of the prediction unit (step S1010).

As shown in FIG. 5, when the size of the prediction unit and the size of the transform unit are the same, the intra prediction on the prediction unit may be performed based on the reference pixel information that exists near the current prediction unit.

When the prediction unit is partitioned into a plurality of transform units, the intra prediction may be performed based on the neighboring reference pixel of the transform unit (step S1020).

When the prediction unit is plural, as described above in FIG. 7 or FIG. 9, the intra prediction may be performed by using reference pixel information that is different per transform unit in a predetermined scanning order. When performing the intra prediction per transform unit, reconstructed pixel information of the transform unit of which intra prediction is performed earlier in an order of performing the intra prediction may be used as the reference pixel information in the transform unit for performing next intra prediction.

In order for the decoder to perform the intra prediction, various information related to the intra prediction such as location information indicating where the prediction unit is located in the picture, size information of the prediction unit, information related to whether the prediction unit is partitioned into a plurality of transform units, intra-prediction mode information of the prediction unit, information about whether the intra prediction of the prediction unit is performed with respect to the luma information or the chroma information may be inputted. Information related to whether the prediction unit is partitioned into a plurality of transform units may be obtained based on information such as transform unit partition flag information (e.g., split_transform-_flag) for determining whether the prediction unit is partitioned into the transform units.

For example, if the transform unit partition flag information is 1, a prediction unit may be partitioned into a plurality of transform units, a size of the transform unit (log2TrafoSize) may be reduced to half, and a transform depth (trafoDepth) may be increased by 1. Each partitioned transform unit may perform the intra prediction based on the same intra prediction mode information.

As shown in FIG. 8, if the current prediction unit is partitioned into a plurality of transform units and the current prediction unit has a rectangular shape using the short distance intra prediction method, each transform unit may be partitioned into a plurality of squares based on the transform unit partition flag information, and each transform unit may perform the intra prediction by using the neighboring reference pixel information of the each transform unit based on the same intra prediction mode, thereby generating the predicted block.

The transform unit partition flag information is information indicating whether the prediction unit is partitioned into a plurality of transform units, and it is possible to express whether the prediction unit is partitioned into a plurality of transform units in other flag information as long as it does not depart from the spirit and scope of the present invention.

Figure 11:
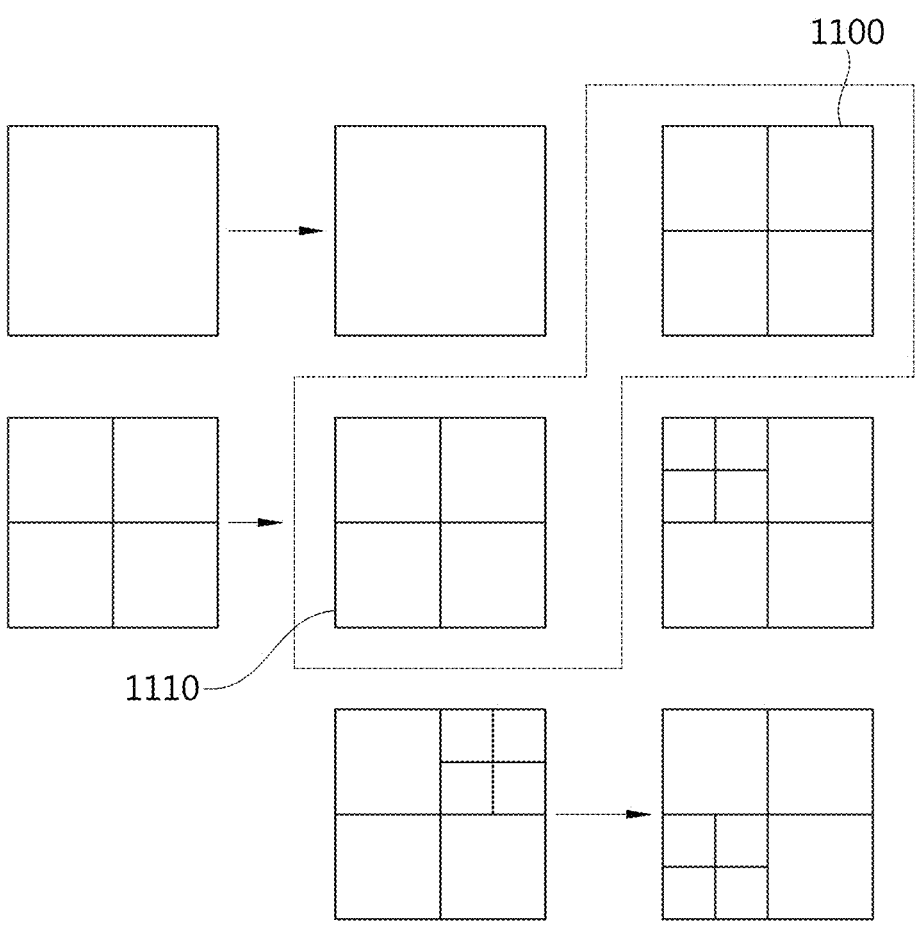
FIG. 11 is a conceptual diagram illustrating a method of partitioning a coding unit according to an another exemplary embodiment of the present invention.

FIG. 11 is an another exemplary embodiment of the present invention illustrating a method of partitioning a coding unit.

Referring to FIG. 11, when performing the intra prediction according to the size of the coding unit, plural partitions may be possible.

The left side of FIG. 11 shows a block combination which is partitioned into the coding units, and the right side of FIG. 11 shows a block combination of the coding unit that can be partitioned into the prediction units. For illustrative purposes, only a coding unit of a specific size is schematically shown.

A method of generating the prediction unit with respect to a 16×16 size coding unit includes firstly a method of performing the intra prediction by using a prediction unit of a 16×16 size which is the same size as the coding unit and a method 1100 of performing the intra prediction by partitioning into a plurality of 8×8 size prediction units.

Next, various methods such as a method of performing the intra prediction by using a prediction unit of the same as the size of the respective coding unit based on a block which partitions the coding unit of the 16×16 size into four coding units of the 8×8 size or a method of performing the intra prediction by partitioning a coding block located at the left side upper portion into a plurality of prediction units to perform the intra prediction.

Referring now to FIG. 11, it can be known that the method 1100 of predicting using a plurality of prediction units with respect to a 16×16 coding unit and the method 1110 of partitioning the coding unit into a plurality of coding units and performing the intra prediction with respect to the plurality of coding units by using a prediction unit (2N×2N) having the same size as the coding unit is a block having the same prediction unit. In other words, unless it is the smallest coding unit and if the coding unit is partitioned into the prediction unit of N×N to perform the intra prediction, the same partition process is used twice with respect to the same prediction unit. In order to prevent such unnecessary repetition of the same process, the coding unit may be partitioned into a plurality of prediction unit in the intra prediction only when the coding unit has a minimum coding unit size.

The minimum coding unit size may be defined in a predetermined parameter group. For example, by using flag information including size information of the minimum coding unit and flag information including difference information between the smallest coding unit and the largest coding unit, size information of the smallest coding unit and size information of the largest coding unit may be known. When performing the intra prediction based on the size information of the coding unit provided in the parameter group, prediction using the NxN partition may be performed only in a coding unit having the minimum size. When performing prediction using the NxN partition only in the coding unit having the minimum size, flag which provides information about whether to partition may be coded and decoded only when the size of the coding unit is the minimum size. A size of the coding unit used for the intra prediction may be defined in various syntax elements as shown in Table 12 to Table 16 below.

Table 1 is a syntax indicating an intra prediction method according to a size of the coding unit according to an exemplary embodiment of the present invention.

TABLE 1

| Prediction unit(x0, y0, curPredUnitSize){ |
| --- |
| ... |
| if(entropy coding mode flag) |
| if(currCodingUnitSize==MinCodingUnitSize) |
| intra_split_flag |
| Combined_intra_pred_flag |
| if(currCodingUnitSize==MinCodingUnitSize){ |
| for(i=0;i<(intra_split_flag?4:1);i++){ |
| prev_intra_luma_pred_flag |
| if(!prev_intra_luma_pred_flag) |
| rem_intra_luma_pred_mode |
| } |
| else{ |
| prev_intra_luma_pred_flag |
| if(!prev_intra_luma_pred_flag) |
| rem_intra_luma_pred_mode |
| } |
| ... |

Referring to Table 1, a syntax element (currCodingUnitSize; hereinafter referred to as "current coding unit size information") indicating size information of the current coding unit may be compared to a syntax element (MinCodingUnitSize; hereinafter referred to as "minimum coding unit size information") indicating size information of the smallest coding unit. If the current coding unit size information and the minimum coding unit size information are the same, by using the information intra_spilt_flag indicating whether the current coding unit is partitioned into a plurality of prediction units for performing the intra prediction and combined_intra_pred_flag indicating the intra prediction mode information of the partitioned prediction unit, it may be determined whether the current coding unit is partitioned into a plurality of prediction units only when the size of the current coding unit is the size of the minimum coding unit. Also, by distinguishing a case where the coding unit size information and the minimum coding unit size information are the same from a case where the two are not the same, intra prediction mode information of a neighboring prediction unit may be derived.

Namely, by distinguishing the case where the coding unit size information and the minimum coding unit size information are the same from the case where the coding unit size information and the minimum coding unit size information are not the same, when the coding unit size information and the minimum coding unit size information are the same, the intra prediction mode for one or a plurality of prediction units may be obtained based on information whether the coding unit is divided into a plurality of prediction units. When the coding unit size information and the minimum coding unit size information are not the same, the prediction mode information of the coding unit may be obtained without determining whether the coding unit is partitioned or not.

In a coding unit partitioning method according to an exemplary embodiment of the present invention, the current coding unit size information (currCodingUnitSize) is compared to the minimum coding unit size information (MinCodingUnitSize) and, when performing the intra prediction, the coding unit which is not the minimum coding unit is not partitioned into a plurality of prediction unit. However, this is only an example and the coding unit partitioning method may be implemented in other syntax structure and a new syntax definition as long as they do not depart from the spirit and scope of the present invention. Also, intra_split_flag or combined_intra_pred_flag, which is used when the coding unit is partitioned into a plurality of prediction units, is example flag information and it is possible to use other flag information or a flag in a form of combining with other information as long as it does not depart from the spirit and scope of the present invention.

Table 2 is a syntax indicating an intra prediction method according to a size of the coding unit according to an exemplary embodiment of the present invention.

TABLE 2

| Prediction unit(x0, y0, curPredUnitSize){ |
| --- |
| ... |
| if(entropy coding mode flag) |
| if(currCodingUnitSize==8) |
| intra_split_flag |
| Combined_intra_pred_flag |
| if(currCodingUnitSize==8){ |
| for(i=0;i<(intra_split_flag?4:1);i++){ |
| prev_intra_luma_pred_flag |
| if(!prev_intra_luma_pred_flag) |
| rem_intra_luma_pred_mode |
| } |
| else{ |
| prev_intra_luma_pred_flag |
| if(!prev_intra_luma_pred_flag) |
| rem_intra_luma_pred_mode |
| } |
| ... |

Table 2 shows a syntax structure of a case in which a minimum coding unit has a size of 8×8.

By determining whether the coding unit has the size of 8×8, information split_transform_flag indicating whether the 8×8 size coding unit is partitioned into a plurality of transform units and combined_intra_pred_flag indicating whether the intra prediction mode information of the partitioned prediction unit may be obtained. Also, as described above, by distinguishing the case where the coding unit size information and the minimum coding unit size information are the same from the case where the two are not the same, the intra prediction mode information of the coding unit may be derived.

In a coding unit partitioning method according to an exemplary embodiment of the present invention, the current coding unit size information (currCodingUnitSize) is compared to the minimum coding unit size information (Min-CodingUnitSize) and, when performing the intra prediction, the coding unit which is not the minimum coding unit is not partitioned into a plurality of prediction units. However, this is only an example and a coding unit partitioning method that does not partition the coding unit into a plurality of prediction units when the coding unit is greater than the minimum coding unit size may be implemented in other syntax structure and a new syntax definition as long as they do not depart from the spirit and scope of the present invention.

Table 3 through Table 7 are syntaxes indicating an intra prediction method according to a size of the coding unit according to an another exemplary embodiment of the present invention.

Table 3 through Table 7 show a syntax element for performing the intra prediction by partitioning the coding unit into a plurality of prediction units only when the coding unit disclosed in Table 1 and Table 2 are the minimum coding unit.

First, referring to Table 3 through table 5, in a coding tree syntax, a predetermined syntax element may be used to distinguish whether the size of the coding unit is the minimum and, only when the coding unit is not the size of the minimum coding unit, information about whether the coding unit is partitioned into a plurality of prediction units may be provided.

decoded such that prediction related information of the current encoding unit may be decoded.

The cu_split_pred_part_mode is a syntax element which combines flag information split_coding_unit_flag which indicates whether the current coding unit is partitioned, flag information skip_flag which indicates whether the current coding unit performs the intra prediction by using the skip mode, flag information merge_flag which indicates whether the current coding unit performs the inter prediction by using the merge mode, information PredMode which indicates what the prediction mode of the current coding unit is, and information PartMode which indicates partition type information of the current coding unit, and prediction related information of the current coding unit may be displayed by using the mapping table of Table 4 or Table 5 according to the size of the current coding unit.

When using the cu_split_pred_part_mode according to an exemplary embodiment of the present invention, whether the coding unit is the minimum coding unit is determined and a method of using Table 4 if the size of the coding unit is greater than the minimum coding unit and using Table 5 if the size of the coding unit is the minimum coding unit is used such that the coding unit is partitioned into a plurality of prediction units to perform the intra prediction only when the size of the coding unit is the minimum coding unit. In other words, a different index value may be used to define a case where the size of the coding unit is greater than the

TABLE 3

```
coding_tree( x0, y0, log2CUSize ) {
if( x0  +  ( 1 << log2CUSize ) <= PicWidthInSamples_L &&y0 + ( 1 << log2CUSize ) <=
PicHeightInSamples_L &&cuAddress( x0, y0 ) >= SliceAddress ) {
if( !entropy_coding_mode_flag && slice_type != I )
cu_split_pred_part_mode[ x0 ][ y0 ]
else if( log2CUSize > Log2MinCUSize )
split_coding_unit_flag[ x0 ][ y0 ]
}
```

TABLE 4

| cu_split_pred_part_mode | split_coding_unit_flag | skip_flag | merge_flag | PredMode | PartMode |
|---|---|---|---|---|---|
| 0 | 1 | — | — | — | — |
| 1 | 0 | 1 | — | MODE_SKIP | PART_2N × 2N |
| 2 | 0 | 0 | 1 | MODE_INTER | PART_2N × 2N |
| 3 | 0 | 0 | 0 | MODE_INTER | PART_2N × 2N |
| 4 | 0 | — | — | MODE_INTER | PART_2N × N |
| 5 | 0 | — | — | MODE_INTER | PART_N × 2N |
| 6 | 0 | — | — | MODE_INTRA | PART_2N × 2N |

TABLE 5

| cu_split_pred_part_mode | split_coding_unit_flag | skip_flag | merge_flag | PredMode | PartMode |
|---|---|---|---|---|---|
| 0 | 0 | 1 | — | MODE_SKIP | PART_2N × 2N |
| 1 | 0 | 0 | 1 | MODE_INTER | PART_2N × 2N |
| 2 | 0 | 0 | 0 | MODE_INTER | PART_2N × 2N |
| 3 | 0 | — | — | MODE_INTER | PART_2N × N |
| 4 | 0 | — | — | MODE_INTER | PART_N × 2N |
| 5 | 0 | — | — | MODE_INTRA | PART_2N × 2N |
| (escape | | | | MODE_INTRA | PART_N × N |
| symbol) | | | | MODE_INTER | PART_N × N |

Namely, referring to Table 3 through Table 5, the entropy encoding is performed by using CAVLC (Context Adaptive Variable Length Coding), and in a case where the current slice type is an I slice, cu_split_pred_part_mode may be minimum coding unit and a case where the size of the coding unit is the same as the minimum coding unit.

Referring to Table 4, when the size of the coding unit (log2CUSize) is greater than the size of the minimum coding unit (Log2MinCUSize), the coding unit is partitioned into a plurality of prediction units in any cu_split_pred_part_mode and N×N is not used for the partition type information PartMode for performing the intra prediction.

Referring to Table 5, when the size of the coding unit (log2CUSize) is the same as the size of the minimum coding unit (Log2MinCUSize) and the cu_split_pred_part_mode is 5, the coding unit may be partitioned into a plurality of prediction units when performing the intra prediction by using N×N for the partition type information PartMode.

If a condition for using Table 3 through Table 5 is not met, Table 6 and Table 7 which are a syntax indicating a method of performing the intra prediction according to the size of the coding unit may be used.

TABLE 6

```
coding_unit( x0, y0, log2CUSize ) {
if( entropy_coding_mode_flag && slice_type != I )
skip_flag[ x0 ][ y0 ]
if( skip_flag[ x0 ][ y0 ] )
prediction_unit( x0, y0, log2CUSize, log2CUSize, 0, 0 )
else {
if( !entropy_coding_mode_flag ) {
if( slice_type == I && log2CUSize == Log2MinCUSize )
intra_part_mode
} else if( slice_type != I || log2CUSize = = Log2MinCUSize )
pred_type
...
```

Referring to Table 6, when the CAVLC is used for a binary coding method, the slice type is the I slice, and the size of the coding unit is the minimum coding unit, a syntax element of intra_part_,mode is used. when CABAC (Context-Adaptive Binary Arithmetic Coding) is used for the binary coding method, the slice type is a P slice or B slice, or the size of the coding unit is the size of the minimum coding unit, a syntax element of pred_type is used to perform the N×N partition only when the size of the coding unit is the minimum coding unit, thereby partitioning one coding unit into a plurality of prediction units.

The intra_part_mode is a syntax element indicating whether the current coding unit is partitioned into 2N×2N or partitioned into N×N, and if the size of the current coding unit is minimum, whether the coding unit is to be partitioned into a plurality of prediction units is indicated.

Table 7 below shows pred_type and the syntax element pred_type may include partitioning indicating flag IntraSplitFlag, the prediction mode information PredMode, and the partitioning mode information PartMode according to the type of the slice.

In Table 7, if the size of the current coding unit is greater than the size of the minimum coding unit, the syntax element pred_type limits a value of the pred_type not to be 3 or 5 such that the N×N partition may be used in the partition mode only when the size of the current coding unit is the minimum coding unit size. Also, additionally, if the slice type is the I slice and the size of the coding unit is greater than the minimum coding unit size, it may be estimated that the current prediction mode is the intra prediction mode, the partition type is 2N×2N, the partition display information is 0, to be used.

The N×N is not used for the partition type information PartMode for partitioning into a plurality of prediction units in order to perform the intra prediction.

In other words, as described in Table 3 to Table 7, based on a predetermined syntax element which indicates whether the coding unit is partitioned into a plurality of prediction units, only when the size of the coding unit is the minimum coding unit, the N×N partition is used when performing the intra prediction, thereby implementing the same prediction unit partitioning process as described in Table 1 and Table 2. In a method of performing the intra prediction according to the size of the coding unit according to an exemplary embodiment of the present invention, various implementation methods may exist and such various implementation methods are included in the claim scope of the present invention as long as they do not depart from the spirit and scope of the present invention.

Table 8 through Table 10 are a syntax indicating a method of performing the intra prediction according to the size of the coding unit according to an another exemplary embodiment of the present invention.

The size of the minimum coding unit for performing the intra prediction may be set as 4×4. Since the minimum size of the prediction unit for the intra prediction and the minimum size of the transform unit for the transformation are 4×4, when the size of the coding unit for performing the intra prediction is 4×4, one coding unit may not be partitioned into a plurality of transformation units and the prediction units and the sizes of the coding unit, the transform unit, and the prediction unit are the same. Therefore, if the size of the coding unit is 4×4 when performing the intra prediction, prediction unit partition information related to whether to partition one coding unit into the plurality of the prediction units or transform unit partition information related to whether to partition one coding unit into the plurality of the transform units becomes unnecessary information such that the prediction unit partition information and the transform unit partition information may need to be identified only when the coding unit is not the 4×4 size for performing the intra prediction.

TABLE 7

| slice_type | pred_type | IntraSplitFlag | PredMode | PartMode |
|---|---|---|---|---|
| I | 0 | 0 | MODE_INTRA | PART_2N × 2N |
| | 1 | 1 | MODE_INTRA | PART_N × N |
| P or B | 0 | — | MODE_INTER | PART_2N × 2N |
| | 1 | — | MODE_INTER | PART_2N × N |
| | 2 | — | MODE_INTER | PART_N × 2N |
| | 3 | — | MODE_INTER | PART_N × N |
| | 4 | 0 | MODE_INTRA | PART_2N × 2N |
| | 5 | 1 | MODE_INTRA | PART_N × N |
| | inferred | — | MODE_SKIP | PART_2N × 2N |

TABLE 8

```
coding_unit( x0, y0, currCodingUnitSize) {
if( PredMode==Mode Intra ) MincodingUnitSize==MinCoingUnitSize Intra;
else MinCodingUnitSize=MinCodingUnitSize Inter;
if(       x0+currCodingUnitSize<PicWidthInSampleL&&       y0+currCodingUnitSize<
PicHeightInSampleL&&
currCodingUnitSize>MinCodingUnitSize)
split_coding_unit_flag
...
```

Referring to Table 8, regarding information indicating the minimum coding unit size MinCodingUnitSize, a minimum coding unit size MinCodingUnitSize Intra for performing the intra prediction and a minimum coding unit size Min-CodingUnitSize Inter for performing the inter prediction may be set. Only when the size of the current coding unit is greater than the size of the minimum coding unit, information about whether the coding unit is partitioned into the plurality of coding units may be provided through the information split_coding_unit_flag which indicates whether the coding unit is partitioned into the plurality of coding units.

TABLE 9

```
prediction_unit( x0, y0, log2CUSize ) {
...
if(PredMode==MODE INTRA)
...
if(currCodingUnitSize!=4){
if(entropy_coding_mode_flag)
intra_split_flag
}
combined_intra_pred_flag
for(i=0;i<(intra_split_flag?4:1);i++){
prev_intra_luma_pred_flag
if(!pred_intra_luma_pred_flag)
rem_intra_luma_pred_mode
}
}
...
}
```

Referring to Table 9, whether the current coding unit has the minimum size of 4×4 for performing the intra prediction is determined and, only when the size of the current coding unit is not 4×4, information related to whether the current coding unit is partitioned into a plurality of prediction units may be provided by using the information intra_split_flag indicating whether one coding unit is partitioned into a plurality of prediction units for performing the intra prediction.

TABLE 10

```
transform_unit( x0, y0, currTransformUnitSize) {
if(currTransformUnitSize>MinTransformUnitSize&&currTransformUnitSize<=MaxTransformUnitSize)
if( CurrCodingUnitSize!=4 )
split_transform_unit_flag
```

Referring to Table 10, whether the current coding unit has the minimum size of 4×4 for performing the intra prediction is determined and, only when the size of the current coding unit is not 4×4, the information related to whether the current coding unit is partitioned into a plurality of prediction units may be provided.

In other words, when the minimum size of the coding unit is limited to the 4×4 size when performing the intra prediction, in case of the coding unit having the 4×4 size, information about the prediction unit in which the current coding block performs the prediction and the transformed transform unit may be obtained without obtaining the information split_coding_unit_flag which indicates whether to partition one coding unit into a plurality of coding units, the information intra_split_flag indicating whether to partition one coding unit into the plurality of the prediction units, and information split_transform_unit_flag indicating whether to partition one coding unit into a plurality of coding units.

In a method of determining the size of the coding unit according to an exemplary embodiment of the present invention, the intra prediction and the inter prediction may be performed based on the coding unit. In other words, the prediction unit may not be separately generated in the picture and the partitioned coding unit may be used as a unit for performing the prediction to determine whether to perform the inter prediction and the intra prediction in the coding unit. When using the prediction method based on the coding unit, if the prediction (Short distance Intra Prediction (SDIP), Asymetric Motion Partitioning (AMP), etc.) is performed based on a block of a rectangular shape, not a square shape, the inter prediction and the intra prediction may be performed through a method of transmitting additional partition information.

In the prediction method based on the coding unit according to an exemplary embodiment of the present invention, when performing the prediction based on partition of the coding unit, sizes of a block for performing the intra prediction and a block for performing the inter prediction may be different. For example, through a method of differentiating the sizes of the minimum coding unit capable of performing the inter prediction and the minimum coding unit capable of performing the intra prediction, overall coding efficiency may be increased.

Table 11 below shows a method of differently setting the minimum size of the coding unit used in the intra prediction and the inter prediction.

TABLE 11

| Index | Minimum coding unit for performing the inter prediction | Minimum coding unit for performing the intra prediction |
|---|---|---|
| 0 | 8 × 8 | 4 × 4 |
| 1 | 16 × 16 | 8 × 8 |
| 2 | 32 × 32 | 16 × 16 |

TABLE 11-continued

| Index | Minimum coding unit for performing the inter prediction | Minimum coding unit for performing the intra prediction |
|---|---|---|
| 3 | 64 × 64 | 32 × 32 |
| 4 | 128 × 128 | 64 × 64 |

Referring to Table 11, by setting the size of the coding unit for performing the intra prediction to be one size less than the size of the coding unit for performing the inter prediction, when performing the intra prediction, the prediction is performed in the coding unit of a smaller size than the case of performing the inter prediction, thereby improving overall video quality.

The size of the minimum coding unit for performing the inter prediction may be calculated based on a syntax element log2_min_coding_unit_size_minus3 which indicates the size information of the minimum coding unit, as in the following Equation 1, and the size of the minimum coding unit for performing the intra prediction may be determined to be one size less than the size of the minimum coding unit, as in the following Equation 1 below.

$$MinCodingUnitSizeInter = 2^{(log2\_min\_coding\_unit\_minus3+3)}$$ [Equation 1]

$$MinCodingUnitSizeIntra = 2^{(log2\_min\_coding\_unit\_minus3+3-1)}$$

Table 12 shows a syntax for determining whether to partition the coding unit.

Only when the coding unit is not the minimum coding unit based on the size of the minimum coding unit for performing the intra prediction and the size of the minimum coding unit for performing the inter prediction, a syntax element split_coding_unit_flag which determines whether the current coding unit is to be partitioned may be determined.

TABLE 12

```
coding_unit( x0, y0, currCodingUnitSize){
If(PredMode==MODE INTRA)
MinCodingUnitSize=MinCodingUnitSizeIntra;
else MinCodingUnitSize=MinCodingUnitSizeInter;
If(x0+currCodingUnitSize<PicWidthInSampleL&&
Y0+currCodingUnitSize<PicHeightInSampleL&&
currCodingUnitSize>MinCodingUnitSize)
split_coding_unit_flag
...
```

Table 13 is a syntax which shows a case where the intra prediction is performed based on the encoding unit.

TABLE 13

```
prediction_unit( x0, y0, currPredUnitSize ){
...
If(PredMode==MODE INTRA){
...
combined_intra_pred_flag
{
prev_intra_luma_pred_flag
If(!pred_intra_luma_pred_flag)
rem_intra_luma_pred_mode
}
}
...
}
```

In Table 13, the coding unit in which the intra prediction is performed is not partitioned into the prediction unit so that the prediction mode information of the coding unit may be obtained through combined_intra_pred_flag with respect to the coding unit in which the intra prediction is performed without a syntax element intra_split_flag which indicates whether the coding unit is partitioned into the prediction unit.

In Table 11 through Table 13, in a prediction method based on the coding unit according to an another exemplary embodiment of the present invention, the coding unit is used as a block for performing the prediction unit as described above to perform the intra prediction and the inter prediction such that the method may reduce complexity of the encoding the decoding and may be used in an embodiment which requires a low delay.

In a method of setting the transform unit size according to an another exemplary embodiment of the present invention, the size of the encoding unit and the size of the transform unit may be set as the same. Through the method of equalizing the size of the transform unit and the size of the coding unit, the encoding and the decoding may be performed with a lower complexity.

Table 14 below is a table showing a case where the size of the coding unit is the same as the size of the transform unit.

TABLE 14

| Size of the Coding Unit | Size of the Transform Unit | split_transform_unit_flag |
|---|---|---|
| 2N × 2N | 2N × 2N | 0 |

Referring to Table 14, by equalizing sizes of the coding unit and the transform unit, the size information of the transform unit may be obtained without requiring the split_transform_flag information which indicates the partition information of the transform unit and inverse transformation may be performed based on the size of the coding unit.

For example, based on syntax element information such as cuDepth, cu_split_pred_part_mode, pred_type or split_coding_unit_flag which is a syntax element indicating whether the coding unit is partitioned in size as described above, the size information and the partition information of the coding unit may be obtained. Also, a method of using the partitioned coding unit as the transform unit may be used without separately defining the transform unit.

When the size of the coding unit and the transform unit are equalized, the coding and the decoding may be performed at a lower complexity when performing the encoding and the decoding. Since the size of the coding unit and the size of the transform unit are the same, the size of the transform unit is not dependent on the partition information of the prediction unit and may be determined independently, the transform unit partition information may be obtained from the current picture regardless of the prediction unit.

In a method of determining the size of the coding unit according to an another exemplary embodiment of the present invention, the size of the maximum coding unit for performing the prediction may be set different according to the prediction method.

A method of limiting the size of the maximum coding unit for performing the prediction may be defined based on a specific parameter set.

Table 15 below shows the size of the coding unit according to a prediction method defined in a sequence parameter set (SPS).

TABLE 15

| seq_parameter_set_rbsp( ){ | | |
|---|---|---|
| ... | | |
| max_coding_unit_width_inter | 0 | ue(v) |
| max_coding_unit_height_inter | 0 | ue(v) |
| max_coding_unit_width_intra | 0 | ue(v) |
| max_coding_unit_height_intra | 0 | ue(v) |
| ... | | |
| } | | |

Referring to Table 15, max_coding_unit_width_inter indicating a width of a largest coding unit among prediction units for performing the inter prediction, max_coding_unit_height_inter indicating a height of the largest coding unit among the prediction units for performing the inter prediction, and max_coding_unit_width_intra indicating a width of a largest coding unit among prediction units for performing the intra prediction, and max_coding_unit_height_intra indicating a width of the largest coding unit among the prediction units for performing the intra prediction may be defined as a syntax element such that sizes of the coding unit for performing the inter prediction and the maximum coding unit for performing the intra prediction may be differentiated based on a corresponding value.

In another method, by using a syntax element as Table 16 below, a size of the maximum coding unit for performing each prediction may be defined.

TABLE 16

| seq_parameter_set_rbsp( ){ | | |
|---|---|---|
| ... | | |
| max_coding_unit_width_inter | 0 | ue(v) |
| max_coding_unit_height_inter | 0 | ue(v) |
| difference_between_inter_intra_width | 0 | ue(v) |
| difference_between_inter_intra_height | 0 | ue(v) |
| ... | | |
| } | | |

Referring to Table 16, similar to Table 15, a syntax element indicating a width of the largest coding unit for performing the inter prediction may be defined as max_coding_unit_width_inter and a height of the largest coding unit for performing the inter prediction may be defined as max_coding_unit_height_inter. However, differently from Table 15, based on information difference_between_inter_intra_width indicating a difference between the width of the coding unit for performing the intra prediction and the width of the coding unit for performing the inter prediction in order to indicate the width of the largest coding unit for performing the intra prediction and information difference_between_inter_intra_height indicating a difference between the height of the coding unit for performing the intra prediction and the height of the coding unit for performing the inter prediction in order to indicate the height of the largest coding unit for performing the intra prediction, the width of the maximum coding unit and the height of the maximum coding unit of the coding unit for performing the intra prediction may be indicated.

difference_between_inter_intra_width and difference_between_inter_intra_height may be obtained as the following Equation 2.

$$Max\_coding\_unit\_width\_intra = \text{[Equation 2]}$$
$$max\_coding\_unit\_width\_inter -$$
$$difference\_between\_inter\_intra\_width$$
$$Max\_coding\_unit\_height\_intra = max\_coding\_unit\_width\_inter -$$
$$difference\_between\_inter\_intra\_height$$

In another method, by using a syntax element as Table 17 below, a size of the coding unit for performing each prediction may be defined.

TABLE 17

| seq_parameter_set_rbsp( ){ | | |
|---|---|---|
| ... | | |
| max_coding_unit_width_inter | 0 | ue(v) |
| max_coding_unit_height_inter | 0 | ue(v) |
| ... | | |
| } | | |

Referring to Table 17, only max_coding_unit_width_inter indicating the width of the largest coding unit for performing the inter prediction and max_coding_unit_height_inter indicating the height of the largest coding unit for performing the inter prediction may be defined in a parameter set.

max_coding_unit_width_intra which indicates the width of the largest coding unit among the prediction unit for performing the intra prediction and max_coding_unit_height_intra which indicates the height of the largest coding unit among the prediction unit for performing the intra prediction may be derived from defined max_coding_unit_width_inter and max_coding_unit_height_inter by the following Equation 3.

$$max\_coding\_unit\_width\_intra = \text{[Equation 3]}$$
$$max\_coding\_unit\_width\_inter >> 1$$
$$max\_coding\_unit\_height\_inra = max\_coding\_unit\_height\_inter >> 1$$

In another method, by using a syntax element as Table 18 below, the size of the coding unit for performing each prediction may be defined.

TABLE 18

| seq_parameter_set_rbsp( ){ | | |
|---|---|---|
| ... | | |
| max_coding_unit_size | 0 | ue(v) |
| ... | | |
| } | | |

Referring to Table 18, after max_coding_unit_size which defines the size of the largest coding unit is defined, the width of the maximum coding unit for performing the intra prediction and the inter prediction is defined as max_coding_unit_width, and the height of the maximum coding unit for performing the intra prediction and the inter prediction is defined as max_coding_unit_height, a value set by max_coding_unit_size may be used as a value of the max_coding_unit_width and the max_coding_unit_height. In other words, the size of the maximum coding unit for performing the intra prediction and the inter prediction may be set to be the same.

In another method, by using a syntax element as Table 19 below, the size of the coding unit for performing each prediction may be defined.

TABLE 19

| seq_parameter_set_rbsp( ){ | | |
|---|---|---|
| ... | | |
| max_coding_unit_size | 0 | ue(v) |
| difference_between_inter_intra | 0 | ue(v) |
| ... | | |
| } | | |

Referring to Table 19, based on max_coding_unit_size which indicates the size of the largest coding unit and difference_between_inter_intra which indicates a difference between sizes of the largest coding unit for performing the inter prediction and the largest coding unit for performing the intra prediction, the syntax elements max_coding_unit_width_inter, max_coding_unit_height_inter, max_coding_unit_width_intra, max_coding_unit_height_intra defined in Table 15 may be obtained by the following Equation 4.

$$\text{max\_coding\_unit\_width\_inter} = \text{max\_coding\_unit\_size} \quad \text{[Equation 4]}$$

$$\text{max\_coding\_unit\_height\_inter} = \text{max\_coding\_unit\_size}$$

$$\text{max\_coding\_unit\_width\_intra} = \text{max\_coding\_unit\_width\_inter} -$$

$$\text{difference\_between\_inter\_intra}$$

$$\text{max\_coding\_unit\_height\_intra} = \text{max\_coding\_unit\_height\_inter} -$$

$$\text{difference\_between\_inter\_intra}$$

In another method, by using a syntax element as Table 20 below, the size of the coding unit for performing each prediction may be defined.

TABLE 20

| seq_parameter_set_rbsp( ){ | | |
|---|---|---|
| ... | | |
| max_coding_unit_size | 0 | ue(v) |
| ... | | |
| } | | |

Based on max_coding_unit_size which is a syntax element indicating the size of the largest coding unit, the syntax elements max_coding_unit_width_inter, max_coding_unit_height_inter, max_coding_unit_width_intra, max_coding_unit_height_intra, defined in Table 5 may be obtained through the following Equation 5 below.

$$\text{max\_coding\_unit\_width\_inter} = \text{max\_coding\_unit\_size} \quad \text{[Equation 5]}$$

$$\text{max\_coding\_unit\_height\_inter} = \text{max\_coding\_unit\_size}$$

$$\text{max\_coding\_unit\_width\_intra} = \text{max\_coding\_unit\_width\_inter} >> 1$$

$$\text{max\_coding\_unit\_height\_intra} = \text{max\_coding\_unit\_height\_inter} >> 1$$

The example embodiments of Table 15 and Table 20 as above are embodiments for obtaining information related to the width and the height of the maximum coding unit performing the intra prediction and information related to the width and the height of the maximum coding unit performing the inter prediction, and other implementation methods and embodiments are possible as long as they do not depart from the spirit and scope of the present invention.

Figure 12:
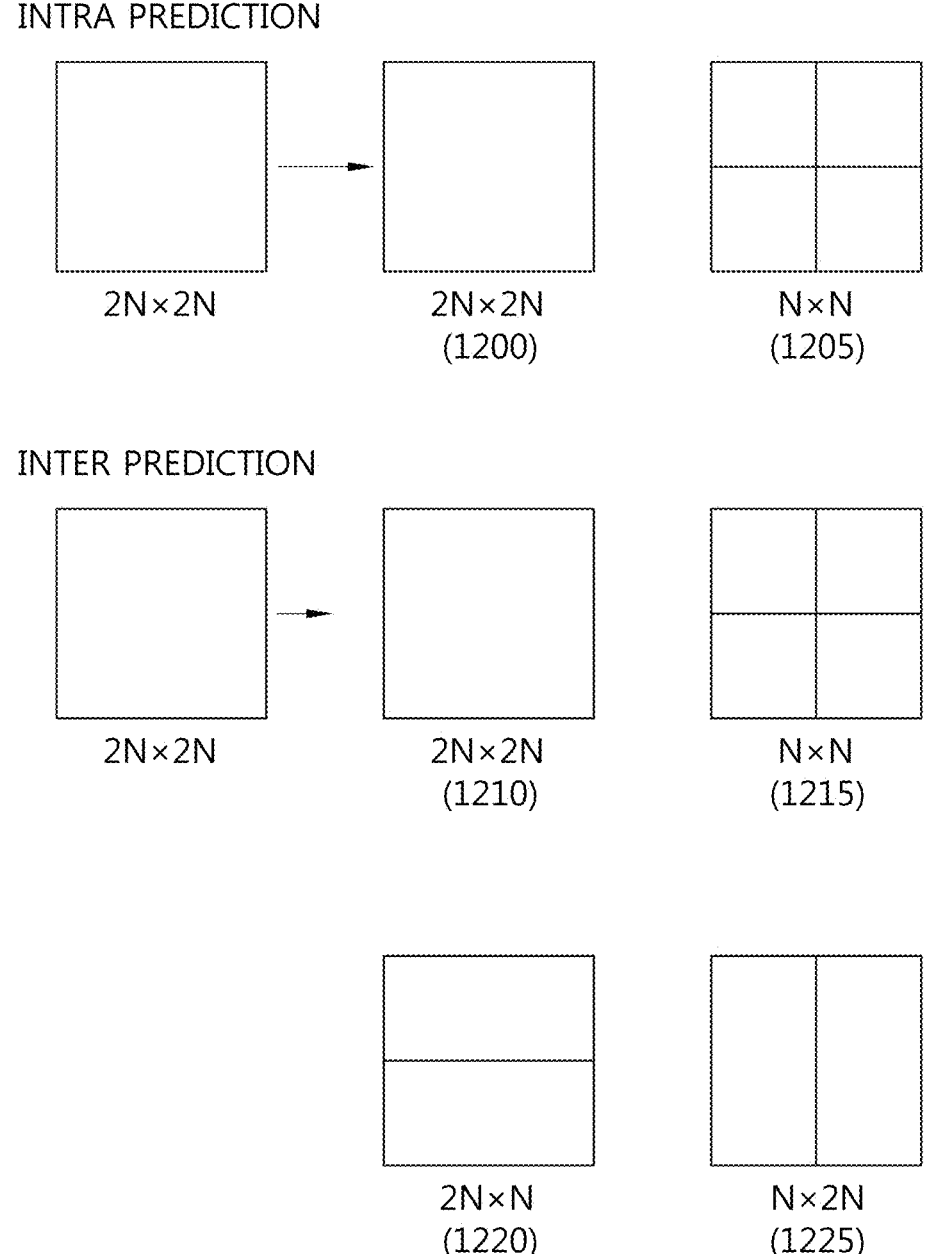
FIG. 12 is a conceptual diagram illustrating a block partitioning method for performing an intra prediction and an inter prediction according to an another exemplary embodiment of the present invention.

FIG. 12 is an another exemplary embodiment of the present invention illustrating a block partitioning method for performing an intra prediction and an inter prediction.

Referring to FIG. 12, a block for performing the intra prediction may partition the coding unit of 2N×2N into a prediction unit 1200 of 2N×2N using the same size as the coding unit and a prediction unit 1205 which partitions the coding unit of 2N×2N into N×N.

A block for performing the inter prediction may partition the coding unit of 2N×2N into a prediction unit 1210 of 2N×2N using the same size as the coding unit, a prediction unit 1215 which partitions the coding unit of 2N×2N into N×N, a prediction unit 1220 which partitions the coding unit of 2N×2N into 2N×N, and a prediction unit 1225 which partitions the coding unit of 2N×2N into N×2N.

According to an exemplary embodiment of the present invention, prediction may be performed by classifying the intra prediction and the inter prediction into a predetermined category according to a block partitioning method.

Table 21 below classifies the intra prediction method into a predetermined category according to a partitioned prediction unit type.

Referring to Table 21, a category of the block partition for performing the intra prediction may be divided into a 1 type partition method and a 2 type partition method.

TABLE 21

| Partition type | Partition Type |
|---|---|
| 1 type partition method | 2N × 2N |
| 2 type partition method | 2N × 2N |
| | N × N(partition type in case of the minimum coding unit) |

In case of the 1 type partition method, the intra prediction is performed by using only the 2N×2N block 1200 in which the size of the coding unit and the size of the prediction unit are the same, and in case of the 2 type partition method, the intra prediction is performed by using the 2N×2N block 1200 in which the size of the coding unit and the size of the prediction unit are the same and the N×N block 1205 in which the coding unit having a 2N×2N size is partitioned into four partition units having an N×N size.

In the 2 type partition method, a method of performing the intra prediction by partitioning the coding unit of the 2N×2N size into four coding units of the N×N size may be performed when the size of the coding unit has the minimum coding unit as described above, and the size of the minimum coding unit may be set to various sizes such as, for example, 128×128, 64×64, 32×32, 16×16, 8×8.

Table 22 below classifies the intra prediction method into a predetermined category according to the partitioned prediction unit.

Referring to Table 22, a category of the block partition for performing the intra prediction may be divided into a 3 type partition method and a 4 type partition method.

TABLE 22

| Partition Type | Partition Type |
|---|---|
| 3 Type Partition Method | 2N × 2N |
| | 2N × N |
| | N × 2N |

TABLE 22-continued

| Partition Type | Partition Type |
|---|---|
| 4 Type Partition Method | 2N × 2N |
| | 2N × N |
| | N × 2N |
| | N × N(Partition type in case of the minimum coding unit) |

The 3 type partition method partitions the coding unit of the 2N×2N size into the prediction unit of 2N×2N 1210, 2N×N 1220, N×2N 1225 and the 4 type partition method partitions the coding unit of the 2N×2N size into the prediction unit of 2N×2N 1210, 2N×N 1215, N×2N 1220, and N×N 1225.

In the 4 type partition method, a partition of the N×N size 1225 may be used only when the size of the coding unit is the minimum coding unit, and the size of the smallest coding unit may be set variously as described above.

When the size of the minimum coding unit is 8×8, in an example embodiment of transmitting information about whether to use the 3 type partition method which does not use the N×N partition or whether to use the 4 type partition method which uses the N×N partition, flag information 4×4 size may be used with respect to a coding block of the 8×8 size, and when inter_4×4_enabled_flag is 0 and the size of the coding unit is 8×8, the intra prediction method using the prediction unit of the 4×4 size may not be used with respect to the coding block of the 8×8 size, such that the 3 type partition method is used. Hereinafter, in an exemplary embodiment of the present invention, when the size of the minimum coding unit is 8×8, a flag allowInterN×N which allows partitioning the coding unit into a plurality of prediction blocks of the 4×4 size to perform the inter prediction may be newly defined such that, if the size of the coding unit is greater than 8 or inter_4×4_enabled_flag is 1, allowInterN×N is set as true, and if the size of the coding unit is 8 and inter_4×4_enabled_flag is 0, allowInterN×N is set as false, thereby implementing the 3 type partition method or the 4 type partition method.

Table 23 below is a table that defines an index of cu_split_pred_part_mode which is a syntax element including the partition information when a value of allowInterN×N is true and Table 24 below is a table that defines an index of cu_split_pred_part_mode which is a syntax element including the partition information when the value of allowInterN×N is false.

TABLE 23

| cu_split_pred_part_mode | split_coding_unit_flag | skip_flag | merge_flag | PredMode | PartMode |
|---|---|---|---|---|---|
| 0 | 0 | 1 | — | MODE_SKIP | PART_2N × 2N |
| 1 | 0 | 0 | 0 | MODE_INTER | PART_2N × 2N |
| 2 | 0 | 0 | 1 | MODE_INTER | PART_2N × 2N |
| 3 | 0 | — | — | MODE_INTER | PART_2N × N |
| 4 | 0 | — | — | MODE_INTER | PART_N × 2N |
| 5 | 0 | — | — | MODE_INTRA | PART_2N × 2N |
| (escape symbol) | | | | MODE_INTRA | PART_N × N |
| | | | | MODE_INTER | PART_N × N |

TABLE 24

| cu_split_pred_part_mode | split_coding_unit_flag | skip_flag | merge_flag | PredMode | PartMode |
|---|---|---|---|---|---|
| 0 | 0 | 1 | — | MODE_SKIP | PART_2N × 2N |
| 1 | 0 | 0 | 0 | MODE_INTER | PART_2N × 2N |
| 2 | 0 | 0 | 1 | MODE_INTER | PART_2N × 2N |
| 3 | 0 | — | — | MODE_INTER | PART_2N × N |
| 4 | 0 | — | — | MODE_INTER | PART_N × 2N |
| 5 | 0 | — | — | MODE_INTRA | PART_2N × 2N |
| (escape symbol) | | | | MODE_INTRA | PART_N × N | setting such that an N×N prediction may not be performed when performing the inter prediction may be used. For example, a flag disable_inter_4×4_flag which prevents a 4×4 prediction when the size of the minimum coding unit is 8×8 or a flag inter_4×4_enabled_flag which prevents the 4×4 prediction when the size of the minimum coding unit is 8×8 may be used such that the inter prediction may not be performed on a 4×4 prediction unit. Such flag information may be defined in a predetermined parameter set such as SPS to be used. The above two flags are a flag having the same function, and thus, the description of an exemplary embodiment will be made with respect to inter_4×4_enabled_flag.

In an inter prediction method according to an exemplary embodiment of the present invention, if inter_4×4_enabled_flag is 1 with respect to the minimum coding unit of a 8×8 size, an intra prediction method using a prediction unit of a Referring to Table 23 and Table 24, in a case where the value of allowInterN×N is true, an N×N block is used when performing the inter prediction when an index value of cu_spilt_pred_part_mode is 5; however, in a case where the value of allowInterN×N is false, the N×N block is not used when performing the inter prediction when the index value of cu_spilt_pred_part_mode is 5. In other words, in a case where the value of allowInterN×N is true, the 3 type partition method is used, and in a case where the value of allowInterN×N is false, the 4 type partition method is used.

When performing the inter prediction described above, a method of distinguishing a block used for performing the prediction by using a predetermined flag is an example embodiment and another method may be used as long as it does not depart from the spirit and scope of the present invention and such method is also included in the claim scope of the present invention. For example, inter_4×4_enabled_flag which is a flag indicating whether the inter prediction is possible by using the 4×4 block as the prediction unit in the inter prediction is an example and, in a case where the minimum coding unit size is not 8×8, a flag indicating whether the minimum coding unit may be partitioned into a plurality of prediction units may be used by using other flag information.

In case of the intra prediction, as shown in Table 21, it may be determined whether to use the 1 type partition or 2 type partition according to whether the size of the coding unit is the same as the minimum coding unit. An example embodiment of the present invention below shows a combination of the 1 type partition method and the 2 type partition method that are a partition type of a block used for performing the intra prediction and the 3 type partition method and the 4 type partition method that are a partition type o a block used for performing the inter prediction. In other words, a category of the block partition used in the intra prediction and the inter prediction described in Table 21 and Table 22 may be used in various combinations to determine the block partitioning method used for prediction of the picture.

With respect to the I slice including only the coding unit which includes the prediction unit used for the intra prediction, information related to the partition type may be transmitted by using a method as Table 23 below in case of using the 1 type partition method and in case of the 2 type partition.

TABLE 25

| Partition Type | Transform unit size | Signal |
|---|---|---|
| 1 Type Partition Method | 2N × 2N | |
| 2Type Partition Method | 2N × 2N | In case of the minimum coding unit, 0 |
| | N × N | In case of the minimum coding unit, 1 |

Referring to Table 25, when the I slice uses the 1 type partition method, the method of partitioning into the prediction unit is one such that the partition information may be expressed without an additional bit for expressing the partition method. However, when the I slice uses the 2 type partition method, if the coding unit is the minimum coding unit, 2N×2N is used as the prediction unit for performing the intra prediction; however, if the coding unit is the minimum coding unit, specific bit information may be used to express the partition type in order to indicate whether the prediction unit for performing the intra prediction is 2N×2N or N×N. For example, if the coding unit is the minimum coding unit and the size of the prediction unit for performing the intra prediction is set to be the same as the size of the coding unit (2N×2N), 0 may be used to express the partition information of the current coding unit, and when the coding unit is the minimum coding unit and the size of the prediction unit for performing the intra prediction is set to be a size of one quarter of the coding unit (N×N), 1 may be used to express the partition information of the current coding unit.

The binary coding method and the binary bit for expressing the predetermined information described above is one example embodiment and may be varied according to the binary coding method, and such modification is included in the claim scope of the present invention.

In the P slice or B slice, not the I slice, a combination of the 1 type partition method and the 2 type partition method for performing the intra prediction and a combination of the 3 type partition method and the 4 type partition method may be used to perform the inter prediction.

Table 26 is a table indicating a signal bit for transmitting information of the prediction unit used in the coding unit in which the intra prediction is used and the prediction unit used in the coding unit in which the inter prediction is used, according to an exemplary embodiment of the present invention.

TABLE 26

| Prediction Method | Partition Type | Size of the Transform Unit | Signal |
|---|---|---|---|
| intra prediction | 1 type partition method | 2N × 2N | 000 |
| inter prediction | 3 type partition method | 2N × 2N | 1 |
| | | 2N × N | 01 |
| | | N × 2N | 001 |

Referring to Table 26, the 2 type partition may be used in case of the intra prediction and the 3 type partition may be used in case of the inter prediction. As described above, partition information of the current inter prediction may be expressed by using inter_4×4_enabled_flag, as described above.

A signal is 000 in a case where the coding unit uses the intra prediction, 1 in a case of where the specific coding unit uses the intra prediction and the 2N×2N prediction unit is used, and 01 in a case of using the 2N×N prediction unit, and 001 in a case where the N×2N prediction unit is used, and through such binary code, the prediction unit used in the current coding unit may be distinctively expressed.

In the decoder, the prediction method used in the coding unit of the current frame and a partition method information of the coding unit may be provided based on the binary coding information.

Table 27 is a table indicating a signal bit for transmitting information of the prediction unit used in the coding unit in which the intra prediction is used and the prediction unit used in the coding unit in which the inter prediction is used, according to still another exemplary embodiment of the present invention.

TABLE 27

| Prediction Method | Partition Type | Size of Transform Unit | Signal |
|---|---|---|---|
| Intra Prediction | 1 Type Partition Method | 2N × 2N | 000 In case of minimum coding unit, 0000 |
| inter prediction | 4 Type Partition Method | 2N × 2N | 1 |
| | | 2N × N | 01 |
| | | N × 2N | 001 |
| | | N × N | In case of minimum coding unit, 0001 |

Referring to Table 27, the 1 type partition may be used in case of the intra prediction and the 4 type partition may be used in case of the inter prediction.

The partition information of the current coding unit may be expressed by using 0000 in a case where the specific coding unit uses the intra prediction in the minimum coding unit size, 000 in a case of where the specific coding unit is not the minimum coding unit size and uses the intra prediction, 1 in a case of where the 2N×2N prediction unit is used, 01 in a case where the 2N×N prediction unit is used, 001 in a case where the N×2N prediction unit is used, and the N×N prediction unit may be used in the minimum coding unit size, and in a case where the N×N prediction unit is used, 0001 is used. As described above, by using inter_4×4_enabled_flag, the partition information of the current inter prediction may be expressed.

Similarly, in the decoder, the prediction method used in the coding unit of the current frame and the partition method information of the coding unit may be provided based on the binary coding information.

As in Table 25 and Table 27, in a case where one method is used for the intra prediction method and whether the intra prediction or the inter prediction is used in the intra prediction coding unit can be determined, the binary code for indicating the type of the partition used in the intra prediction may not be used.

Table 28 is a table indicating a signal bit for transmitting information of the prediction unit used in the coding unit in which the intra prediction is used and the prediction unit used in the coding unit in which the inter prediction is used, according to an exemplary embodiment of the present invention.

Since only 2N×2N partition is used in a case where the coding unit is not the minimum coding unit in the intra prediction and 2N×2N and N×N partition is used in a case where the coding unit is the minimum coding unit in the intra prediction, the partition method information of the current coding unit may be expressed by differently setting the binary coding bit capable of indicating which partition method is used in the coding unit performing the intra prediction in case of the minimum coding unit to express the partition method information of the current coding unit.

In case of the minimum coding unit, it is possible to differentiate assignment of the binary coding bit; however, if the size information of the coding unit may be determined in advance, it is possible to assign the same bit regardless of whether the size of the current coding unit is the minimum coding unit or not in case of performing the partition of the 2N×2N size.

Also, as described above, whether the current coding unit is the intra prediction may be determined in advance, and if the size of the coding unit is greater than the minimum coding unit, the partition information may not be separately binary coded, and binary information based on a specific binary code may be transmitted only when the coding unit is the minimum coding unit and the coding unit is partitioned into N×N, thereby expressing the partition information for the intra prediction of the current coding unit.

Since the 3 type partition is used when a specific coding unit is used for the inter prediction, in order to indicate which partition method among 2N×2N, 2N×N, N×N is used

TABLE 28

| Prediction Method | Partition Type | Size of Transform Unit | Signal |
|---|---|---|---|
| Intra Prediction | 2 Type Partition Method | 2N × 2N | 000 In case of minimum coding unit, 0000 |
| | | N × N | In case of minimum coding unit, 0001 |
| Inter Prediction | 4 Type Partition Method | 2N × 2N | 1 |
| | | 2N × N | 01 |
| | | N × 2N | 001 |

Referring to Table 28, the 2 type partition may be used in case of the intra prediction and the 3 type partition may be used in case of the inter prediction.

When the specific coding unit uses the intra prediction, according to which partition method among the 2 type partition is used and whether the current coding unit is the minimum coding unit, the binary code may be assigned differently to encode how the current coding unit is partitioned into the prediction unit.

in order to perform the inter prediction in the coding unit, a binary code as in Table 28 may be used.

Table 29 is a table indicating a signal bit for transmitting information of the prediction unit used in the coding unit in which the intra prediction is used and the prediction unit used in the coding unit in which the inter prediction is used, according to an exemplary embodiment of the present invention.

TABLE 29

| Prediction method | Partition Type | Size of Transform Unit | Signal |
|---|---|---|---|
| Intra Prediction | 2 Type Partition Method | 2N × 2N | 000 In case of the minimum unit, 0000 |
| | | N × N | In case of the minimum unit, 0001 |
| Inter Prediction | 4 Type Partition Method | 2N × 2N | 1 |
| | | 2N × N | 01 |
| | | N × 2N | 001 |

TABLE 29-continued

| Prediction method | Partition Type | Size of Transform Unit | Signal |
|---|---|---|---|
| | | $2N \times N$ | In case of the minimum unit, 0001 |

Referring to Table 29, the 2 type partition may be used in case of the intra prediction and the 4 type partition may be used in case of the inter prediction.

When the specific coding unit uses the intra prediction, the binary code may be assigned differently according to whether which partition method is used among the 2 pattern partition and whether the current coding unit is the minimum coding unit such that how the current coding unit is partitioned to the prediction unit may be encoded.

As in Table 29, when the coding unit is not the minimum coding unit in the intra prediction, only the $2N \times 2N$ partition is used, and when the coding unit is the minimum coding unit, the $2N \times 2N$ and $N \times N$ partition is used so that, by differentially setting the binary code for indicating which partition method is used in the coding unit for performing the intra prediction in case of the minimum coding unit, the partition method information of the current coding unit may be expressed.

As shown in Table 25 through Table 29, by classifying a block used for the intra prediction and the inter prediction of the video into a specific category, a time required for encoding the video and a time required for decoding the video may be reduced.

The binary coding method for indicating specific partition type information in table 25 through Table 29 may be variously used and is not limited to the binary encoding method shown in Table 25 through Table 29.

Also, when the specific partition method is frequently used, if the partition method is frequently used, a method of assigning a binary code having a lower bit number in the mapping table including mapping information between the partition method and the binary code may be used. When the specific partition method is used in order to implement such method, a binary coding bit of the partition method located immediately above in an order of the mapping table and to which a relatively smaller binary coding bit is assigned and a binary coding bit assigned to a currently used partition method may be swiped, thereby assigning a lower bit number to a frequently used partition method. In another method, a method of changing assignment of a binary coding on the mapping table when a specific threshold value or more is reached may be used by using the counter.

Although it is possible to express the partition information of the coding unit as independent information as shown in Table 25 through Table 29, it is also possible, for example, that the partition information is combined with additional information related to which method among prediction methods (e.g., Merge, AMVP, SKIP, etc.) is used when the prediction unit performs the inter prediction and defined as new flag information as shown in Tables 23 and 24.

Also, the binary signal used in table 25 through Table 29 as described above is arbitrary, and if additional information may be obtained in other syntax structure, the binary signal for expressing the partition method in the current coding unit may be changed or an estimation method without using a specific binary signal may be used to express the partition method of the current coding unit.

Figure 13:
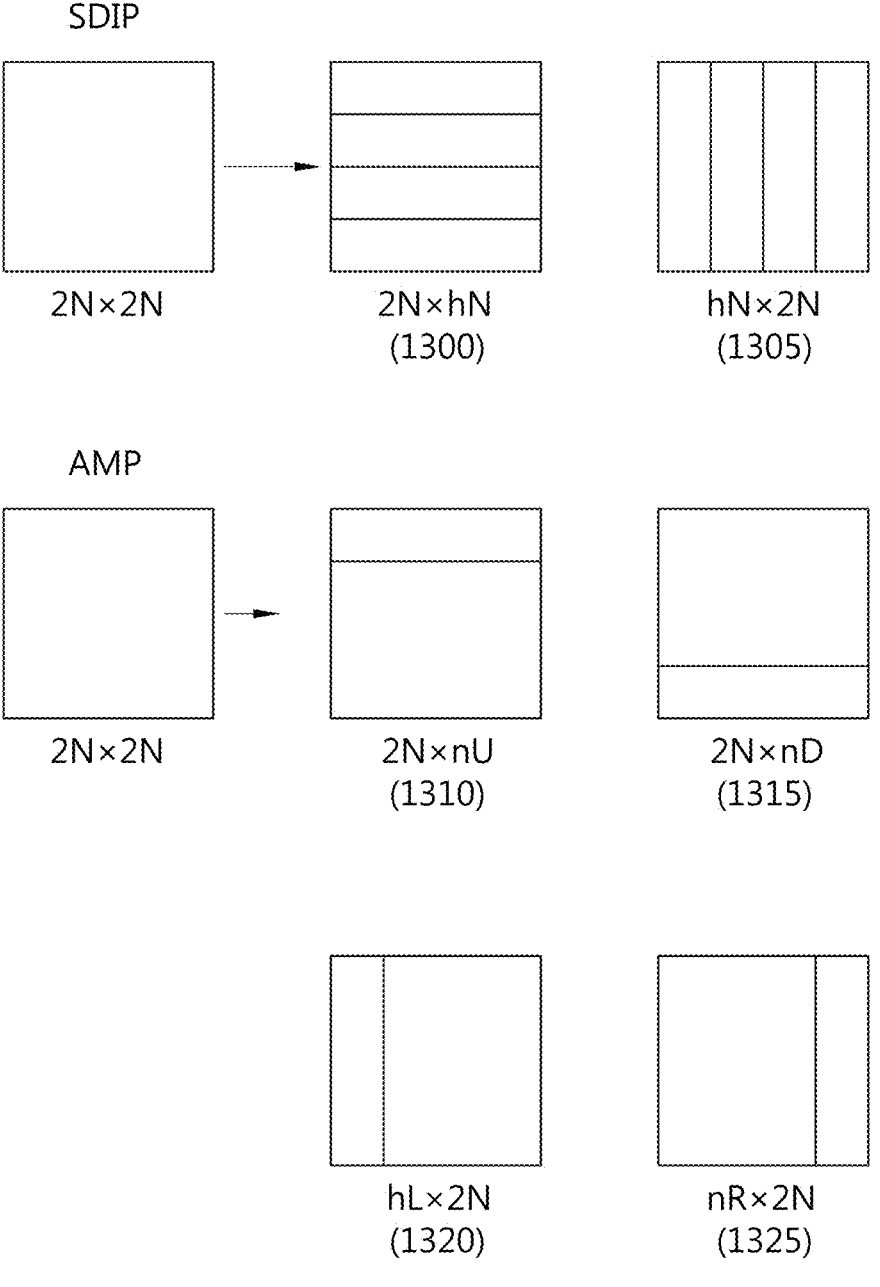
FIG. 13 is a conceptual diagram illustrating a method of classifying a block for performing a prediction in a predetermined category according to an another exemplary embodiment of the present invention.

FIG. 13 is an another exemplary embodiment of the present invention illustrating a method of classifying a block for performing a prediction in a predetermined category.

Referring to FIG. 13, a method of classifying a block for performing the intra prediction in a predetermined category according to still another exemplary embodiment of the present invention may additionally use the short distance intra prediction (SDIP) method. When additionally using the short distance intra prediction method as the intra prediction, $2N \times h$ 1300, $h \times 2N$ 1305 may be added as a partition unit that may be used when performing the intra prediction, and a combination of an additional partition method of the coding unit may be generated.

Referring to a lower part of FIG. 13, the method of classifying a block for performing the intra prediction according to still another exemplary embodiment of the present invention may additionally use an asymmetric motion partitioning (AMP; hereinafter, "asymmetric block partitioning method" is used to refer to the same meaning) method. When additionally using the AMP method, $2N \times nU$ 1310, $2N \times nD$ 1315, $hL \times 2N$ 1320, $nR \times 2N$ 1325 may be used as a partition unit which can be used when performing the intra prediction. In other words, the short distance intra prediction method and the asymmetric motion partitioning method may be generated in various combinations as shown in Table 25 through Table 29 to be used in a predetermined slice for prediction.

The video coding and video decoding method described above may be implemented in each element of the video encoder and video decoder apparatus, respectively, as described above in FIG. 1 and FIG. 2.

While the present disclosure has been described with reference to exemplary embodiments thereof, it will be understood by those of ordinary skill in the art that various changes and modifications may be made therein without departing from the spirit and scope of the present invention as defined by the following claims.

The invention claimed is:

1. A decoding apparatus for image decoding, the decoding apparatus comprising:

a memory; and at least one processor connected to the memory, the at least one processor configured to:

derive a plurality of prediction units from a current coding unit, wherein a current prediction unit is one of the plurality of prediction units;

derive a plurality of transform units from the current coding unit; and perform an intra prediction to generate a predicted block with respect to each of the plurality of transform units by using neighboring reference pixels of the each of the plurality of transform units, wherein the plurality of transform units are located within a region in which the current prediction unit is located, wherein an intra prediction mode is determined for the current prediction unit, and wherein the intra prediction with respect to the each of the plurality of transform units is performed sequentially based on an intra prediction mode that is the same as the intra prediction mode derived for the current prediction unit.

2. An encoding apparatus for image encoding, the encoding apparatus comprising:

a memory; and at least one processor connected to the memory, the at least one processor configured to:

derive a plurality of prediction units from a current coding unit, wherein a current prediction unit is one of the plurality of prediction units;

derive a plurality of transform units from the current coding unit;

perform intra prediction to generate a predicted block with respect to each of the plurality of transform units by using neighboring reference pixels of the each of the plurality of transform units; and encode video information including prediction mode information on the current prediction unit, wherein the plurality of transform units are located within a region in which the current prediction unit is located, wherein an intra prediction mode is determined for the current prediction unit, and wherein the intra prediction with respect to the each of the plurality of transform units is performed sequentially based on an intra prediction mode that is the same as the intra prediction mode derived for the current prediction unit.

3. An apparatus for storing data for an image, the apparatus comprising:

at least one processor configured to obtain a bitstream for the image, wherein the bitstream is generated based on deriving a plurality of prediction units from a current coding unit, wherein a current prediction unit is one of the plurality of prediction units, deriving a plurality of transform units from the current coding unit, performing intra prediction to generate a predicted block with respect to each of the plurality of transform units by using neighboring reference pixels of the each of the plurality of transform units, and encoding video information including prediction mode information on the current prediction unit; and a storage medium configured to store the data comprising the bitstream, wherein the plurality of transform units are located within a region in which the current prediction unit is located, wherein an intra prediction mode is determined for the current prediction unit, and wherein the intra prediction with respect to the each of the plurality of transform units is performed sequentially based on an intra prediction mode that is the same as the intra prediction mode derived for the current prediction unit.

\* \* \* \* \*